(12) United States Patent
Garvey et al.

(10) Patent No.: US 10,817,803 B2
(45) Date of Patent: Oct. 27, 2020

(54) DATA DRIVEN METHODS AND SYSTEMS FOR WHAT IF ANALYSIS

(71) Applicant: Oracle International Corporation, Redwood Shores, CA (US)

(72) Inventors: Dustin Garvey, Oakland, CA (US); Sampanna Shahaji Salunke, Dublin, CA (US); Uri Shaft, Fremont, CA (US); Amit Ganesh, San Jose, CA (US); Sumathi Gopalakrishnan, Redwood Shores, CA (US)

(73) Assignee: Oracle International Corporation, Redwood Shores ( * ) Notice: Subject to any disclaimer, the term of this patent is extended or adjusted under 35 U.S.C. 154(b) by 616 days.

(21) Appl. No.: 15/612,999

(22) Filed: Jun. 2, 2017

(65) Prior Publication Data

US 2018/0349797 A1    Dec. 6, 2018

(51) Int. Cl.
*G06N 20/00*        (2019.01)
*G06F 9/46*         (2006.01)

(52) U.S. Cl.
CPC ............. *G06N 20/00* (2019.01); *G06F 9/46* (2013.01)

(58) Field of Classification Search
CPC .................................. G06N 20/00; G06F 9/46
See application file for complete search history.

(56) References Cited

U.S. PATENT DOCUMENTS

| | | |
|---|---|---|
| 6,298,063 B1 | 10/2001 | Coile et al. |
| 6,438,592 B1 | 8/2002 | Killian |
| 6,597,777 B1 | 7/2003 | Ho |
| 6,643,613 B2 | 11/2003 | McGee et al. |
| 6,996,599 B1 | 2/2006 | Anders et al. |
| 7,343,375 B1 | 3/2008 | Dulac |

(Continued)

FOREIGN PATENT DOCUMENTS

| | | | |
|---|---|---|---|
| CN | 105426411 A | | 3/2016 |
| CN | 109359763 A | * | 2/2019 |

(Continued)

OTHER PUBLICATIONS

Hao et al., Visual Analytics of Anomaly Detection in Large Data Streams, Proc. SPIE 7243, Visualization and Data Analysis 2009, 10 pages.

(Continued)

*Primary Examiner* — Austin Hicks
(74) *Attorney, Agent, or Firm* — Invoke

(57) ABSTRACT

Techniques are described for applying what-f analytics to simulate performance of computing resources in cloud and other computing environments. In one or more embodiments, a plurality of time-series datasets are received including time-series datasets representing a plurality of demands on a resource and datasets representing performance metrics for a resource. Based on the datasets at least one demand propagation model and at least one resource prediction model are trained. Responsive to receiving an adjustment to a first set of one or more values associated with a first demand: (a) a second adjustment is generated for a second set of one or more values associated with a second demand; and (b) a third adjustment is generated for a third set of one or more values that is associated with the resource performance metric.

20 Claims, 15 Drawing Sheets

(56) References Cited

U.S. PATENT DOCUMENTS

| | | |
|---|---|---|
| 7,529,991 B2 | 5/2009 | Ide et al. |
| 7,672,814 B1 | 3/2010 | Raanan et al. |
| 7,739,143 B1 | 6/2010 | Dwarakanath et al. |
| 7,739,284 B2 | 6/2010 | Aggarwal et al. |
| 7,783,510 B1 | 8/2010 | Gilgur et al. |
| 7,987,106 B1 | 7/2011 | Aykin |
| 8,200,454 B2 | 6/2012 | Dorneich et al. |
| 8,229,876 B2 | 7/2012 | Roychowdhury |
| 8,234,236 B2 | 7/2012 | Beaty et al. |
| 8,363,961 B1 | 1/2013 | Avidan et al. |
| 8,576,964 B2 | 11/2013 | Taniguchi et al. |
| 8,650,299 B1 | 2/2014 | Huang et al. |
| 8,676,964 B2 | 3/2014 | Gopalan et al. |
| 8,694,969 B2 | 4/2014 | Bernardini et al. |
| 8,776,066 B2 | 7/2014 | Krishnamurthy et al. |
| 8,880,525 B2 | 11/2014 | Galle et al. |
| 8,930,757 B2 | 1/2015 | Nakagawa |
| 8,949,677 B1 | 2/2015 | Brundage et al. |
| 9,002,774 B2 | 4/2015 | Karlsson |
| 9,141,914 B2 | 9/2015 | Viswanathan et al. |
| 9,147,167 B2 | 9/2015 | Urmanov et al. |
| 9,195,563 B2 | 11/2015 | Scarpelli |
| 9,218,232 B2 | 12/2015 | Khalastchi et al. |
| 9,292,408 B2 | 3/2016 | Bernstein et al. |
| 9,323,599 B1 | 4/2016 | Iyer et al. |
| 9,323,837 B2 | 4/2016 | Zhao et al. |
| 9,330,119 B2 | 5/2016 | Chan et al. |
| 9,355,357 B2 | 5/2016 | Hao et al. |
| 9,367,382 B2 | 6/2016 | Yabuki |
| 9,389,946 B2 | 7/2016 | Higuchi |
| 9,471,778 B1 | 10/2016 | Seo et al. |
| 9,495,220 B2 | 11/2016 | Talyansky |
| 9,507,718 B2 | 11/2016 | Rash et al. |
| 9,514,213 B2 | 12/2016 | Wood et al. |
| 9,529,630 B1 | 12/2016 | Fakhouri et al. |
| 9,658,916 B2 | 5/2017 | Yoshinaga et al. |
| 9,692,662 B2 | 6/2017 | Chan et al. |
| 9,710,493 B2 | 7/2017 | Wang et al. |
| 9,727,533 B2 | 8/2017 | Thibaux |
| 9,740,402 B2 | 8/2017 | Manoharan et al. |
| 9,779,361 B2 | 10/2017 | Jones et al. |
| 9,811,394 B1 | 11/2017 | Kogias et al. |
| 9,961,571 B2 | 5/2018 | Yang et al. |
| 10,073,906 B2 | 9/2018 | Lu et al. |
| 10,210,036 B2 | 2/2019 | Iyer et al. |
| 2002/0019860 A1 | 2/2002 | Lee et al. |
| 2002/0092004 A1 | 7/2002 | Lee et al. |
| 2002/0183972 A1 | 12/2002 | Enck et al. |
| 2002/0188650 A1 | 12/2002 | Sun et al. |
| 2003/0149603 A1 | 8/2003 | Ferguson et al. |
| 2003/0224344 A1 | 12/2003 | Shamir et al. |
| 2004/0088406 A1 | 5/2004 | Corley et al. |
| 2005/0119982 A1 | 6/2005 | Ito et al. |
| 2005/0132030 A1 | 6/2005 | Hopen et al. |
| 2005/0159927 A1 | 7/2005 | Cruz et al. |
| 2005/0193281 A1 | 9/2005 | Ide et al. |
| 2006/0087962 A1 | 4/2006 | Golia et al. |
| 2006/0106743 A1 | 5/2006 | Horvitz |
| 2006/0212593 A1 | 9/2006 | Patrick et al. |
| 2006/0287848 A1 | 12/2006 | Li et al. |
| 2007/0011281 A1 | 1/2007 | Jhoney et al. |
| 2007/0150329 A1 | 6/2007 | Brook et al. |
| 2007/0179836 A1 | 8/2007 | Juang et al. |
| 2008/0221974 A1 | 9/2008 | Gilgur et al. |
| 2008/0288089 A1 | 11/2008 | Pettus et al. |
| 2009/0030752 A1 | 1/2009 | Senturk-Doganaksoy et al. |
| 2010/0027552 A1 | 2/2010 | Hill |
| 2010/0036857 A1 | 2/2010 | Marvasti et al. |
| 2010/0050023 A1 | 2/2010 | Scarpelli et al. |
| 2010/0082132 A1 | 4/2010 | Marruchella et al. |
| 2010/0082697 A1 | 4/2010 | Gupta et al. |
| 2010/0185499 A1 | 7/2010 | Dwarakanath et al. |
| 2010/0257133 A1 | 10/2010 | Crowe et al. |
| 2010/0324869 A1 | 12/2010 | Cherkasova et al. |
| 2011/0022879 A1 | 1/2011 | Chavda et al. |
| 2011/0040575 A1 | 2/2011 | Wright et al. |
| 2011/0125894 A1 | 5/2011 | Anderson et al. |
| 2011/0126197 A1 | 5/2011 | Larsen et al. |
| 2011/0126275 A1 | 5/2011 | Anderson et al. |
| 2011/0213788 A1 | 9/2011 | Zhao et al. |
| 2011/0265164 A1 | 10/2011 | Lucovsky et al. |
| 2012/0005359 A1 | 1/2012 | Seago et al. |
| 2012/0051369 A1 | 3/2012 | Bryan et al. |
| 2012/0066389 A1 | 3/2012 | Hegde et al. |
| 2012/0110462 A1 | 5/2012 | Eswaran et al. |
| 2012/0110583 A1 | 5/2012 | Balko et al. |
| 2012/0203823 A1 | 8/2012 | Manglik et al. |
| 2012/0240072 A1 | 9/2012 | Altamura et al. |
| 2012/0254183 A1 | 10/2012 | Ailon et al. |
| 2012/0278663 A1 | 11/2012 | Hasegawa |
| 2012/0323988 A1 | 12/2012 | Barzel et al. |
| 2013/0024173 A1 | 1/2013 | Brzezicki et al. |
| 2013/0080374 A1 | 3/2013 | Karlsson |
| 2013/0151179 A1 | 6/2013 | Gray |
| 2013/0326202 A1 | 12/2013 | Rosenthal et al. |
| 2013/0329981 A1 | 12/2013 | Hiroike |
| 2014/0058572 A1 | 2/2014 | Stein et al. |
| 2014/0067757 A1 | 3/2014 | Ailon et al. |
| 2014/0095422 A1 | 4/2014 | Solomon et al. |
| 2014/0101300 A1 | 4/2014 | Rosensweig et al. |
| 2014/0215470 A1 | 7/2014 | Iniguez |
| 2014/0310235 A1 | 10/2014 | Chan et al. |
| 2014/0310714 A1 | 10/2014 | Chan et al. |
| 2014/0325649 A1 | 10/2014 | Zhang |
| 2014/0379717 A1 | 12/2014 | Urmanov et al. |
| 2015/0032775 A1 | 1/2015 | Yang et al. |
| 2015/0033084 A1 | 1/2015 | Sasturkar et al. |
| 2015/0040142 A1 | 2/2015 | Cheetancheri et al. |
| 2015/0046123 A1 | 2/2015 | Kato |
| 2015/0046920 A1 | 2/2015 | Allen |
| 2015/0065121 A1 | 3/2015 | Gupta et al. |
| 2015/0180734 A1 | 6/2015 | Maes et al. |
| 2015/0242243 A1 | 8/2015 | Balakrishnan et al. |
| 2015/0244597 A1 | 8/2015 | Maes et al. |
| 2015/0248446 A1 | 9/2015 | Nordstrom et al. |
| 2015/0251074 A1 | 9/2015 | Ahmed et al. |
| 2015/0296030 A1 | 10/2015 | Maes et al. |
| 2015/0302318 A1 | 10/2015 | Chen et al. |
| 2015/0312274 A1 | 10/2015 | Bishop et al. |
| 2015/0317589 A1 | 11/2015 | Anderson et al. |
| 2016/0034328 A1 | 2/2016 | Poola et al. |
| 2016/0042289 A1 | 2/2016 | Poola et al. |
| 2016/0092516 A1 | 3/2016 | Poola et al. |
| 2016/0105327 A9 | 4/2016 | Cremonesi et al. |
| 2016/0139964 A1 | 5/2016 | Chen et al. |
| 2016/0171037 A1 | 6/2016 | Mathur et al. |
| 2016/0253381 A1 | 9/2016 | Kim et al. |
| 2016/0283533 A1 | 9/2016 | Urmanov et al. |
| 2016/0292611 A1 | 10/2016 | Boe et al. |
| 2016/0294773 A1 | 10/2016 | Yu et al. |
| 2016/0299938 A1 | 10/2016 | Malhotra et al. |
| 2016/0299961 A1 | 10/2016 | Olsen |
| 2016/0321588 A1 | 11/2016 | Das et al. |
| 2016/0342909 A1 | 11/2016 | Chu et al. |
| 2016/0357674 A1 | 12/2016 | Waldspurger et al. |
| 2016/0378809 A1 | 12/2016 | Chen et al. |
| 2017/0061321 A1* | 3/2017 | Maiya Belur .......... G06N 20/00 |
| 2017/0249564 A1 | 8/2017 | Garvey et al. |
| 2017/0249648 A1 | 8/2017 | Garvey et al. |
| 2017/0249649 A1 | 8/2017 | Garvey et al. |
| 2017/0249763 A1 | 8/2017 | Garvey et al. |
| 2017/0262223 A1 | 9/2017 | Dalmatov et al. |
| 2017/0329660 A1 | 11/2017 | Salunke et al. |
| 2017/0351563 A1 | 12/2017 | Miki et al. |
| 2017/0364851 A1 | 12/2017 | Maheshwari et al. |
| 2018/0026907 A1 | 1/2018 | Miller et al. |
| 2018/0039555 A1 | 2/2018 | Salunke et al. |
| 2018/0052804 A1 | 2/2018 | Mikami et al. |
| 2018/0053207 A1 | 2/2018 | Modani et al. |
| 2018/0059628 A1 | 3/2018 | Yoshida |
| 2018/0081629 A1 | 3/2018 | Kuhhirte et al. |
| 2018/0219889 A1 | 8/2018 | Oliner et al. |
| 2018/0321989 A1 | 11/2018 | Shetty et al. |
| 2018/0324199 A1 | 11/2018 | Crotinger et al. |

(56) References Cited

U.S. PATENT DOCUMENTS

| | | | |
|---|---|---|---|
| 2018/0330433 A1 | 11/2018 | Frenzel et al. | |
| 2019/0042982 A1* | 2/2019 | Qu | G06K 9/623 |
| 2019/0065275 A1 | 2/2019 | Wong et al. | |
| 2020/0034745 A1 | 1/2020 | Nagpal et al. | |

FOREIGN PATENT DOCUMENTS

| | | |
|---|---|---|
| JP | 2006-129446 A | 5/2006 |
| WO | 20111071624 A2 | 6/2011 |
| WO | 20131016584 A1 | 1/2013 |

OTHER PUBLICATIONS

Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.

Ahmed, Reservoir-based network traffic stream summarization for anomaly detection, Article in Pattern Analysis and Applications, Oct. 2017.

Faraz Rasheed, "A Framework for Periodic Outlier Pattern Detection in Time-Series Sequences," May 2014, IEEE.

Herbst, "Self-adaptive workload classification and forecasting for proactive resource provisioning", 2014, ICPE'13, pp. 187-198 (Year: 2014).

Yokoyama, Tetsuya, "Windows Server 2008, Certification Test, Part 5: Reliability", Apr. 15, 2008, pp. 124-125 along with 4 pages of English Translation.

Willy Tarreau: "HAProxy Architecture Guide", May 25, 2008 (May 25, 2008), XP055207566, Retrieved from the Internet: URL:http://www.haproxy.org/download/1.2/doc/architecture.txt [retrieved on Aug. 13, 2015].

Voras I et al: "Evaluating open-source cloud computing solutions", MIPRO, 2011 Proceedings of the 34th International Convention, IEEE, May 23, 2011 (May 23, 2011), pp. 209-214.

Voras et al., "Criteria for Evaluation of Open Source Cloud Computing Solutions", Proceedings of the ITI 2011 33rd international Conference on Information Technology Interfaces (ITI), US, IEEE, Jun. 27-30, 2011, 6 pages.

Taylor J W et al: "Forecasting intraday time series with multiple seasonal cycles using parsimonious seasonal exponential smoothing", OMEGA, vol. 40, No. 6, Dec. 2012 (Dec. 2012), pp. 748-757.

Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.

Somlo, Gabriel, et al., "Incremental Clustering for Profile Maintenance in Information Gathering Web Agents", Agents '01, Montreal, Quebec, Canada, May 28-Jun. 1, 2001, pp. 262-269.

Slipetskyy, Rostyslav, "Security Issues in OpenStack", Maste s Thesis, Technical University of Denmark, Jun. 2011, p. 7 (entire document especially abstract).

Nurmi D et al: "The Eucalyptus Open-Source Cloud-Computing System", Cluster Computing and the GRID, 2009. CCGRID '09. 9th IEEE/ACM International Symposium on, IEEE, Piscataway, NJ, USA, May 18, 2009 (May 18, 2009), pp. 124-131.

NPL: Web document dated Feb. 3, 2011, Title: OpenStack Compute, Admin Manual.

Niino,Junichi, "Open Source Cloud infrastructure 'OpenStack', its History and Scheme", available online at <http://www.publickey.1.jp/blog/11/openstack_1.html>, Jun. 13, 2011, 8 pages.

Jarvis, R. A., et al., "Clustering Using a Similarity Measure Based on Shared Neighbors", IEEE Transactions on Computers, vol. C-22, No. 11, Nov. 1973, pp. 1025-1034.

Haugen et al., "Extracting Common Time Trends from Concurrent Time Series: Maximum Autocorrelation Factors with Applications", Stanford University, Oct. 20, 2015, pp. 1-38.

Gueyoung Jung et al: "Performance and availability aware regeneration for cloud based multitier applications", Dependable Systems and Networks (DSN), 2010 IEEE/IFIP International Conference on, IEEE, Piscataway, NJ, USA, Jun. 28, 2010 (Jun. 28, 2010), pp. 497-506.

Davies, David L., et al., "A Cluster Separation measure", IEEE Transactions on Pattern Analysis and Machine Intelligence, vol. PAMI-1, No. 2, Apr. 1979, pp. 224-227.

Chris Bunch et al: "AppScale: Open-Source Platform-As-A-Service", Jan. 1, 2011 (Jan. 1, 2011), XP055207440, Retrieved from the Internet: URL:http://128.111.41.26/research/tech reports/reports/2011-01 .pdf [retrieved on Aug. 12, 2015] pp. 2-6.

Charapko, Gorilla—Facebook's Cache for Time Series Data, http://charap.co/gorilla-facebooks-cache-for-monitoring-data/, Jan. 11, 2017.

Anonymous: "High Availability for the Ubuntu Enterprise Cloud (UEC)—Cloud Controller (CLC)", Feb. 19, 2011 (Feb. 19, 2011), XP055207708, Retrieved from the Internet: URL:http://blog.csdn.net/superxgl/article/details/6194473 [retrieved on Aug. 13, 2015] p. 1.

Andrew Beekhof: "Clusters from Scratch—Apache, DRBD and GFS2 Creating Active/Passive and Active/Active Clusters on Fedora 12", Mar. 11, 2010 (Mar. 11, 2010), XP055207651, Retrieved from the Internet: URL:http://clusterlabs.org/doc/en-US/Pacemaker/1.0/pdf/Clusters from Scratch/Pacemaker-1.0-Clusters from Scratch-en-US.pdi [retrieved on Aug. 13, 2015].

Alberto Zuin: "OpenNebula Setting up High Availability in OpenNebula with LVM", May 2, 2011 (May 2, 2011), XP055207701, Retrieved from the Internet: URL:http://opennebula.org/setting-up-highavailability-in-opennebula-with-lvm/ [retrieved on Aug. 13, 2015] p. 1.

"OpenStack Object Storage Administrator Manual", Jun. 2, 2011 (Jun. 2, 2011), XP055207490, Retrieved from the Internet: URL:http://web.archive.org/web/20110727190919/http://docs.openstack.org/cactus/openstack-object-storage/admin/os-objectstorage-adminguide-cactus.pdf [retrieved on Aug. 12, 2015].

"OpenStack Compute Administration Manual", Mar. 1, 2011 (Mar. 1, 2011), XP055207492, Retrieved from the Internet: URL:http://web.archive.org/web/20110708071910/http://docs.openstack.org/bexar/openstack-compute/admin/os-compute-admin-book-bexar.pdf [retrieved on Aug. 12, 2015].

Wilks, Samuel S. "Determination of sample sizes for setting tolerance limits," The Annals of Mathematical Statistics 12.1 (1941): 91-96.

Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.

Lin, Xuemin, et al. "Continuously maintaining quantile summaries of the most recent n elements over a data stream," IEEE, 2004.

Greenwald et al. "Space-efficient online computation of quantile summaries." ACM Proceedings of the 2001 SIGMOD international conference on Management of data pp. 58-66.

Dunning et al., Computing Extremely Accurate Quantiles Using t-Digests.

Greunen, "Forecasting Methods for Cloud Hosted Resources, a comparison," 2015, 11th International Conference on Network and Service Management (CNSM), pp. 29-35 (Year: 2015).

Suntinger, "Trend-based similarity search in time-series data," 2010, Second International Conference on Advances in Databases, Knowledge, and Data Applications, IEEE, pp. 97-106 (Year: 2010).

Time Series Pattern Search: A tool to extract events from time series data, available online at <https://www.ceadar.ie/pages/time-series-pattern-search/>, retrieved on Apr. 24, 2020, 4 pages.

Time Series Pattern Search: A tool to extract events from time series data, available online at <https://www.ceadar.ie/pages/time-series-pattern-search/>, retrieved on Apr. 24, 2020, 4 pages.

Yin, "System resource utilization analysis and prediction for cloud based applications under bursty workloads," 2014, Information Sciences, vol. 279, pp. 338-357 (Year: 2014).

* cited by examiner

DATA DRIVEN METHODS AND SYSTEMS FOR WHAT IF ANALYSIS

RELATED APPLICATIONS

This application is related to U.S. application Ser. No. 15/266,971, entitled "SEASONAL AWARE METHOD FOR FORECASTING AND CAPACITY PLANNING"; U.S. application Ser. No. 15/445,763, entitled "METHOD FOR CREATING PERIOD PROFILE FOR TIME-SERIES DATA WITH RECURRENT PATTERNS"; U.S. application Ser. No. 15/266,979, entitled "SYSTEMS AND METHODS FOR DETECTING AND ACCOMMODATING STATE CHANGES IN MODELLING"; U.S. application Ser. No. 15/140,358, entitled "SCALABLE TRI-POINT ARBITRATION AND CLUSTERING"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; U.S. application Ser. No. 15/057,062, entitled "UNSUPERVISED METHOD FOR CLASSIFYING SEASONAL PATTERNS"; and U.S. Provisional Patent Appl. No. 62/370,880, entitled "UNSUPERVISED METHOD FOR BASELINING AND ANOMALY DETECTION IN TIME-SERIES DATA FOR ENTERPRISE SYSTEMS", the entire contents for each of which are incorporated by reference herein as if set forth in their entirety.

TECHNICAL FIELD

The present disclosure relates to analytical models that process time-series data. In particular, the present disclosure relates to training and evaluating what-if models to analyze performance of computing resources.

BACKGROUND

In large-scale computing environments, such as datacenters and cloud computing platforms, many different inputs may affect the performance of hardware and software resources. For example, the performance of a database server may be impacted by the frequency of database transactions, user calls, and/or query executions, among other factors. As the number and frequency of inputs into a resource increase, so does the likelihood that the resource's performance will degrade.

System administrators are generally responsible for ensuring that resources within the computing environment are meeting performance expectations. As the demand on resources increase, system administrators may deploy additional resources and/or balance the load across existing resources to maintain the quality of service. As the demands decrease, resources may be brought offline to mitigate waste and improve efficiency. If administrators fail to adequately understand or anticipate demands, system resources may become overloaded, leading to performance degradation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
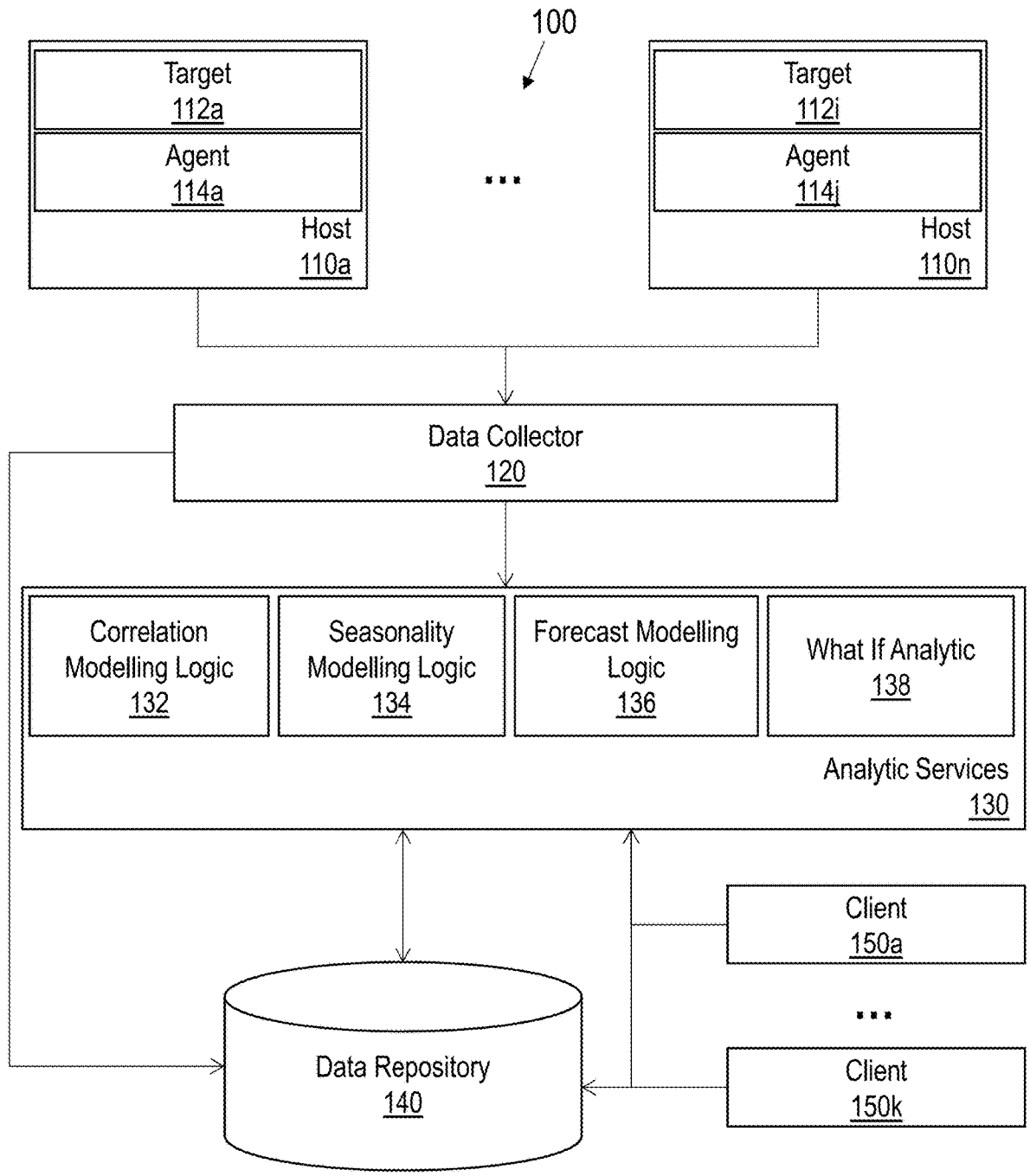
FIG. 1A illustrates an example system comprising a set of what-if analytic services that are driven by time-series data captured from one or more host devices, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. SIMULATION MODELS BASED ON DEMAND AND RESOURCE CORRELATION
4. SEASONAL-AWARE SIMULATION MODELS
5. HISTORICAL SCENARIO SIMULATIONS
6. FORECAST SCENARIO SIMULATIONS
7. COMPUTER NETWORKS AND CLOUD NETWORKS
8. MICROSERVICE APPLICATIONS
9. HARDWARE OVERVIEW

10. MISCELLANEOUS; EXTENSIONS

1. General Overview

System administrators may rely on various tools to monitor system performance in computing environments. For example, system administrators may deploy performance profilers to track various performance metrics associated with hardware and/or software resources. Performance profilers may generate periodic reports that track overall system performance as well as the performance of individual resources. Performance profilers may further generate alerts to notify the system administrator if the performance metrics cross a threshold. The alerts allow system administrators to address problems that may arise in the event of performance degradation or too many idle resources.

Performance profilers are generally directed to analyzing historical metrics. For example, a performance profiler may track various metrics, such as central processing unit (CPU) utilization, physical memory accesses, function calls, database transactions, etc. While historical profiling presents an overall picture of how the system has performed over time, the results are generally constrained to historical observations. System administrators are often interested in analyzing other possible scenarios, even if these scenarios have not occurred in the past.

What-if analytical models allow system administrators to simulate and observe the impact of changes within a system environment. One approach to the what-if analysis is for the system administrator to define performance capacity of a system and the performance requirements for software resources deployed within a system. In the context of a cloud service, for instance, a cloud administrator may define an actual or hypothetical host capacity and the requirements of running an instance of the cloud service on the host. The cloud administrator may then simulate adding and removing instances from the host to determine how system performance is affected. This approach allows administrators to more accurately predict how adding resources affects system performance. However, the approach relies on the administrator's domain knowledge. In complex system with variable inputs and demands, the administrator may not be aware of or be able to keep up with how changes will affect a particular resource.

According to techniques described herein, machine-learning processes and systems may be used to train what-if analytical models (also referred to herein as simulation models) based on historical metrics captured from a computing environment. The machine-learning processes may train/build the simulation models based on a variety of inputs and machine-learning algorithms. The what-if analytic may be implemented to learn complex relationships between system demands and resources from historical time-series data. Additionally or alternatively, the what-if analytic 138 may account for trends and seasonal patterns when training the simulation models. These techniques may provide greater accuracy and more robust analytic capabilities when simulating scenarios in computing environments. As a result, capacity planning operations may be more optimally tuned for a wider variety of scenarios to increase the efficiency with which computing resources are allocated and deallocated within the computing environment.

In one or more embodiments, a simulation model comprises a set of one or more underlying correlation predication models. Each correlation prediction model may be trained using a set time-series datasets associated with at least one demand on a resource and at least one performance metric for the resource. A demand time-series may comprise a sequence of data points captured of time for any input or metric representing the use of a resource. Example demands may include, but are not limited to, user logons to access a resource, transactions per second (e.g., on a database or other transactional system), executions per second, and resource calls per second. Example performance metrics that may be tracked may include, but are not limited to CPU performance metrics (e.g., CPU utilization rates, thread counts, etc.), memory bandwidth metrics (e.g., memory usage rates, cache hit rates, etc.), I/O metrics (e.g., physical reads and writes to disk), and network metrics (e.g., packet counts, packet flow rates, etc.).

Once trained, a correlation prediction model may be used to project values for one or more performance metrics of a resource as a function of learned correlation patterns. For example, a correlation prediction model may output a projected CPU utilization rate based on an input demand or combination of demands. Other correlation prediction models may output other performance metrics depending on the particular implementation.

In one or more embodiments, a simulation model accounts for seasonal correlation patterns. For example, within a computing environment, high and/or low demands may recur on a seasonal basis (e.g., monthly, weekly, daily, etc.) In some cases, the seasonal pattern may correlate strongly with a set of resource performance values, while in other cases, the seasonal pattern may be weakly correlated (or may not correlate at all) with resource performance. For example, weekly high transaction loads may correlate with a decrease in performance for a database resource. On the other hand, weekly low transaction loads may not be correlated with database performance. This may occur due to maintenance and batch process scheduling during low transaction periods of time. The maintenance and batch processing may also significantly impact the database performance, reducing the correlation of low transaction seasonal periods.

In one or more embodiments, a simulation model comprises different correlation prediction models to account for different seasonal patterns. For example, one correlation prediction model may be trained as a function of the correlation between seasonal high data points in transactions and CPU utilization. Another correlation model may be trained as a function of seasonal lows values or some other seasonal pattern. The projected performance values may thus vary based on learned seasonal behavior.

In one or more embodiments, the simulation model may be trained to account for patterns and interdependencies between different demands on a resource. For example, an increase in one demand may correlate to an increase or decrease in another demand. In order to capture this relationship, a demand propagation model may be trained based on the correlation patterns extracted from historical time-series data. The demand propagation models may be used to predict how changes one demand would affect values in other demands.

Once trained, a simulation model may be evaluated against one or more what-if scenarios. Each what-if scenario defines a set of one more scenario parameters including an adjustment to one or more resource and/or demand time-series values. For example, a user may wish to determine how an increase in the number of database transactions and/or one or more other demand affects CPU utilization on a target host. To run the simulation, the user may input, into the simulation model, the magnitude of the adjustment of the set of resource values. In response, the simulation model generates and present a projected adjustment to a set of one or more demand values.

In one or more embodiments, the simulation model may run historical simulations and/or forecast simulations. With a historical simulation, adjustments are made to one or more historical values to determine how the change would have affected past performance. For example, the user may query the simulation model to determine how one hundred more instances of a cloud server would have affected performance of a particular target host in the past week. A forecast simulation, on the other hand, may involve changes to one or more historical values and/or one or more forecasted values to determine how a change would affect future performance. In this case, the simulation model may comprise a forecasting model to project future values. In response to receiving an adjustment to one or more values (e.g., to a resource time-series), the simulation model may adjust a set of forecasted values.

In one or more embodiments, the what-if analytic may be used to optimize system resources and configurations. For example, one or more simulations may be run to determine how various adjustments would affect resource performance. Based on the output of the simulations, one or more responsive actions may be taken. Example responsive actions may include deploying additional resources, bringing resources offline, and adjusting system configurations. If a system administrator is expecting additional demands on a resource, for instance, various scenarios may be evaluated to determine which scenario leads to the optimal resource configuration, which may be the configuration that maximizes performance (or satisfies a threshold level) using the fewest of resources.

2. Architectural Overview

In one or more embodiments, training of a what-if analytic is driven by a plurality of time-series signals. A time series signal, in this context, comprises a sequence of values that are captured over time. The source of the time series signal and the type of information that is captured may vary from implementation to implementation. For example, a time series may be collected from one or more software and/or hardware resources and capture various performance attributes of the resources from which the data was collected. As another example, a time series may be collected using one or more sensors that measure physical properties, such as temperature, pressure, motion, traffic flow, or other attributes of an object or environment.

FIG. 1A illustrates an example system comprising a set of what-if analytic services that are driven by time-series data captured from one or more host devices. System 100 generally comprises hosts 110a-n, data collector 120, analytic services 130, data repository 140, and clients 150a-k. Components of system 100 may be implemented in one or more host machines operating within one or more clouds or other networked environments, depending on the particular implementation. Each component may be distributed over multiple applications and/or machines. Multiple components may be combined into one application and/or machine. Operations described with respect to one component may instead be performed by another component.

Hosts 110a-n represent a set of one or more network hosts and generally comprise targets 112a-i and agents 114a-j. A "target" in this context refers to a resource that serves as a source of time series data. For example, a target may be a software deployment such as a database server instance, middleware instance, or some other software resource executing on a network host. Additionally or alternatively, a target may be a hardware resource, an environmental characteristic, or some other physical resource for which metrics may be measured and tracked.

Agents 114a-j comprise hardware and/or software logic for capturing time-series measurements from a corresponding target (or set of targets) and sending these metrics to data collector 120. In one or more embodiments, an agent includes a process, such as a service or daemon, that executes on a corresponding host machine and monitors one or more software and/or hardware resources that have been deployed. Additionally or alternatively, an agent may include one or more hardware sensors, such as microelectromechanical (MEMs) accelerometers, thermometers, pressure sensors, etc., that capture time-series measurements of a physical environment and/or resource. Although only one agent and target is illustrated per host in FIG. 1A, the number of agents and/or targets per host may vary from implementation to implementation. Multiple agents may be installed on a given host to monitor different target sources of time series data. In other embodiments, an agent that resides remotely on a different host than a target may be responsible for collecting sample time-series data from the target.

Data collector 120 includes logic for aggregating data captured by agents 114a-j into a set of one or more time-series. Data collector 120 may store the time series data in data repository 140. Additionally or alternatively, data collector 120 may provide the time-series data to time-series analytic 130. In one or more embodiments, data collector 120 receives data from agents 114a-j over one or more data communication networks, such as the Internet. Example communication protocols that may be used to transport data between the components illustrated within system 100 may include, without limitation, the hypertext transfer protocol (HTTP), simple network management protocol (SNMP), and other communication protocols of the internet protocol (IP) suite.

In one or more embodiments, data collector 120 collects demand and resource metrics from agents 114a-j. As previously indicated, example demand metrics may include, but are not limited to, user logons to access a resource, transactions per second (e.g., on a database or other transactional system), executions per second, and calls per second associated with the resource. Example performance metrics that may be tracked may include, but are not limited to CPU performance metrics (e.g., CPU utilization rates, thread counts, etc.), memory bandwidth metrics (e.g., memory usage rates, cache hit rates, etc.), I/O metrics (e.g., physical reads and writes to disk), and network metrics (e.g., packet counts, packet flow rates, etc.).

Analytic services 130 includes correlation modelling logic 132, seasonality modelling logic 134, forecast modelling logic 136, and what-if analytic 138. Each service may be invoked independently or in combination to train and/or evaluate time-series models, as described in further detail below. For example, correlation modelling logic 132 may train/evaluate correlation prediction models (e.g., demand propagation models and resource prediction models), seasonality modelling logic 134 may train/evaluate seasonal behavioral models, forecast modelling logic 136 may train/evaluate forecast models, and what-if analytic 138 may evaluate/simulate what-if scenarios using the underlying models. Models may be trained/updated periodically or on-demand based on time-series data collected from targets 112a-i.

Data repository 140 includes volatile and/or non-volatile storage for storing data for analytic services 130, such as trained simulation models and the results of running scenario simulations. Data repository 140 may be implemented by any type of storage unit and/or device (e.g., a file system, database, collection of tables, disk, tape cartridge, random access memory, disk, or any other storage mechanism) for storing data. Further, data repository 140 may include multiple different storage units and/or devices. The multiple different storage units and/or devices may or may not be of the same type or located at the same physical site. Further, data repository 140 may be implemented or may execute on the same computing system as one or more other components of FIG. 1A and/or may reside remotely from one or more other components.

Clients 150*a-k* represent one or more clients that may access analytic services 130 to evaluate what-if scenarios. A "client" in this context may be a human user, such as an administrator, a client program, or some other application instance. A client may execute locally on the same host as time-series analytic or may execute on a different machine. If executing on a different machine, the client may communicate with analytic services 130 via one or more data communication protocols according to a client-server model, such as by submitting HTTP requests invoking one or more of the services and receiving HTTP responses comprising results generated by one or more of the services. Analytic services 130 may provide clients 150*a-k* with an interface through which one or more of the provided services may be invoked. Example interfaces may comprise, without limitation, a graphical user interface (GUI), an application programming interface (API), a command-line interface (CLI) or some other interface that allows a user to interact with and invoke one or more of the provided services.

Figure 1B:
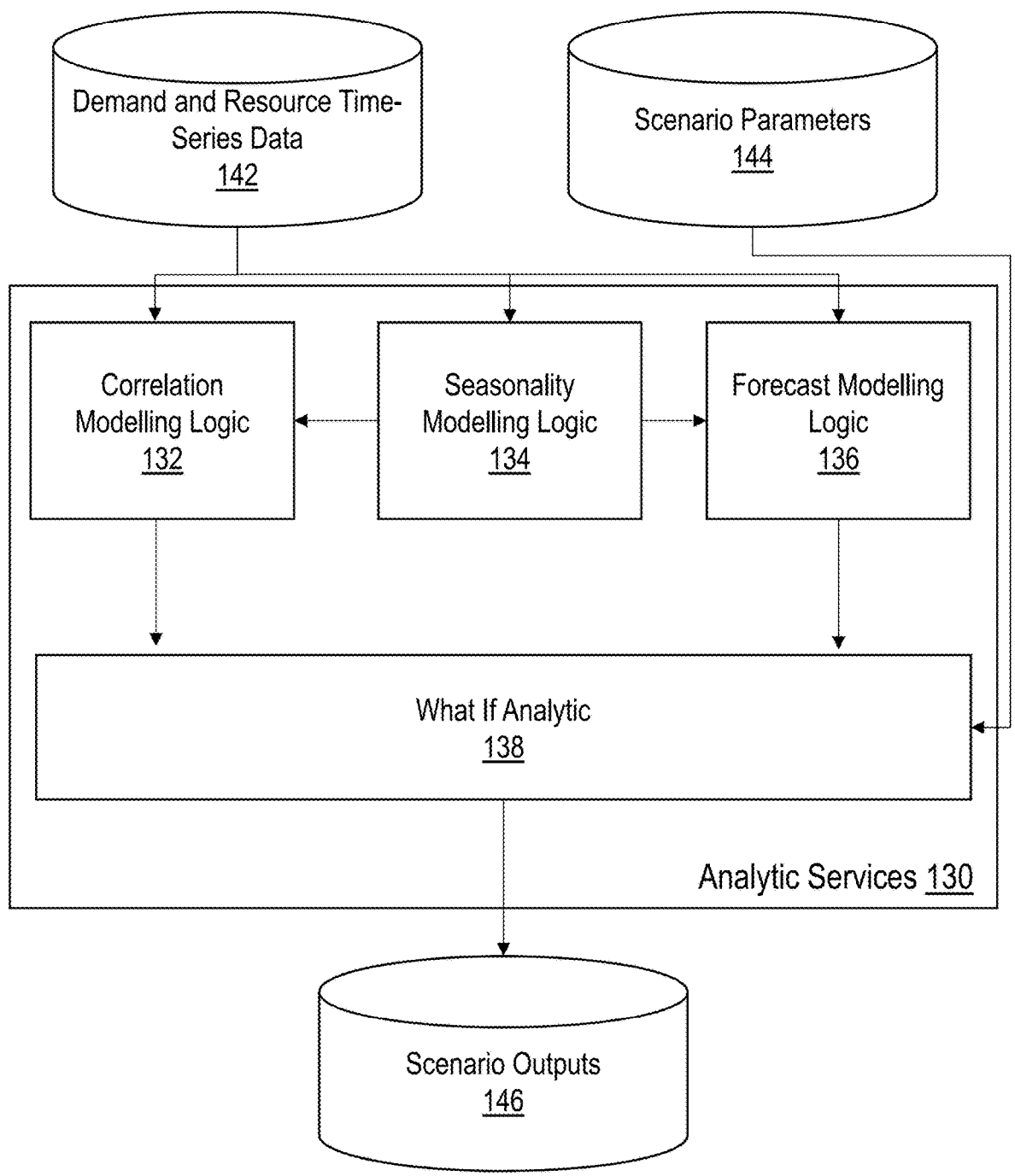
FIG. 1B illustrates an example dataflow for simulating scenarios and generating scenario outputs, in accordance with one or more embodiments.

FIG. 1B illustrates an example dataflow for simulating scenarios and generating scenario outputs, in accordance with one or more embodiments. During a training phase, analytic services 130 receives, as input, demand and resource time-series data 142. Correlation modelling logic 132, seasonality modelling logic 134, and forecast modelling logic 136 each process demand and resource time-series data 142 to build respective time-series models. For example, correlation modelling logic 132 may train correlation prediction models, seasonality modelling logic 134 may train seasonal pattern models, and forecasting modelling logic 136 may train forecast models. Example operations for building and training these time-series models are described in further detail below.

In one or more embodiments, seasonality modelling logic 134 provides seasonal pattern representations to correlation modelling logic 132 and/or forecast modelling logic 136. Based on the seasonal patterns representations, correlation modelling logic 132 may generate seasonal-aware correlation prediction models that account for seasonal behavior in the correlation patterns. Additionally or alternatively, forecast modelling logic 136 may generate seasonal-aware forecast models that account for seasonal behavior in the forecasts.

During an evaluation phase, what-if analytic 138 receives, as input, (a) scenario parameters 144, (b) trained correlation prediction models (including demand propagation and resource prediction models generated by correlation modelling logic 132), (c) trained forecast models (from forecast modelling logic 136). Scenario parameters 144 comprise a set of values that define a particular scenario to simulate. In one or more embodiments, scenario parameters 144 define at least one adjustment to a demand or resource time-series value. For example, a scenario may be defined as follows: "What if my system saw X % more user-demand". Based on this scenario definition, historical and/or forecast simulations may be evaluated by what-if analytic 138.

During the evaluation phase, what-if analytic 138 may use the demand propagation models to project how the change in user demand would affect other demands. For example, for a scenario "What if my system saw X % more transactions", what-if analytic may determine what change, if any, would occur in the number of redo records generated per second and/or any other demand on a database resource. What-if analytic 138 may then generate adjustments to the other demands according to the trained demand propagation models.

Additionally or alternatively, what-if analytic 138 may use the resource prediction models to project how the change in user demand would affect resource performance. The resource prediction model may account for adjustments to other demands. For example, physical writes to disk may be a function of both transactions per second and redo records per second. Thus, an adjustment to the number of transactions per second may be propagated to the redo records per second before adjusting the physical writes to disk. In other words, the projected change to the physical writes is not computed solely as a function of the adjustment to a single demand (e.g., based on a one-to-one mapping between the demand and resource). Rather, complex relationships (e.g., many to one and many-to-many mappings) between different demands and resources are accounted for in the simulation models, which may increase the accuracy of the projected changes.

Based on the evaluation, what-if analytic 138 generates scenario outputs 146. In one or more embodiments, scenario outputs 146 capture adjustments made to demand and/or resource time-series data for a scenario definition. In the example scenario "What if my system saw X % more transactions", for instance, the scenario output may reflect historical and/or forecasted changes to one or more resource performance metrics and/or other demand metrics. Scenario outputs may be stored in data repository 140, provided to clients 150*a-k* (e.g., by sending over a network to another host device or notifying a separate application executing on a host) and/or presented via an interactive display. An application or other user may process the scenario outputs to make adjustments to targets 112*a-i*. For example, if a scenario simulation indicates that predicted performance metrics for a scenario will not satisfy a threshold, additional resources may be deployed and/or existing resources may be reconfigured (e.g., through load balancing, pooling etc.) to boost performance. The number of resources that are deployed may also be selected based on scenario simulations that satisfy the target performance threshold. In other cases, resources may be brought offline or other responsive actions may be taken to optimize system 100 for a particular scenario.

3. Demand Propagation and Resource Prediction Models

Performance of a software or hardware resource may be function of many different inputs and interactions. For example, CPU utilization on a database host may be impacted by the frequency of transactions—a greater the number of transactions per second may typically correlate with a greater CPU utilization. However, CPU utilization may also be affected by other demands, such as the types of queries executed by the database host. On-line transaction processing (OLTP) type queries/workloads, such as table inserts and updates, generally do not impact CPU utilization as significantly as online analytical processing (OLAP) queries/workloads. The reason for the disparity is that OLAP queries generally involve scans and analysis of a much greater number of records within the database than an OLTP query. Other demands may also have varying impact on the database host's performance. Other examples include, but are not limited to, the number of redo records (i.e., a log that stores a history of changes made to the database) generated per second, and the number of user calls to the database.

In one or more embodiments, correlation modelling logic 132 builds a set of correlation prediction models to represent relationships between demands and resources. A correlation prediction model, in this context, is a data object or data structure that is generated, in data repository 140, as a representation of learned pattern of correlation between different time-series. For example, one type of correlation prediction model, also referred to herein as a demand propagation model, may map values for a demand metric to correlated values for another demand metric. For instance, a demand propagation model that maps values associated with one demand (e.g., transactions per second) to another demand (e.g., redo records generated per second). Another type of correlation prediction model, also referred to herein as a resource prediction, may map values for a demand metric to correlated values for a resource performance metric. In the context of CPU utilization, for instance, a model may map one or more demand value ranges (e.g., transactions per second, user calls per second, etc.) to correlated CPU utilization rates.

In one or more embodiments, correlation modelling logic 132 comprises a set of training processes implementing machine-learning algorithms to train a set of models. The machine-learning algorithms may perform regression, clustering, and/or classification to train models, as described further below. The set of training processes may initially train the set of models using a training set of time-series data. As additional time-series data is received, the correlation prediction models may be updated to reflect changes and/or additional learned patterns between resources and demands.

Figure 2:
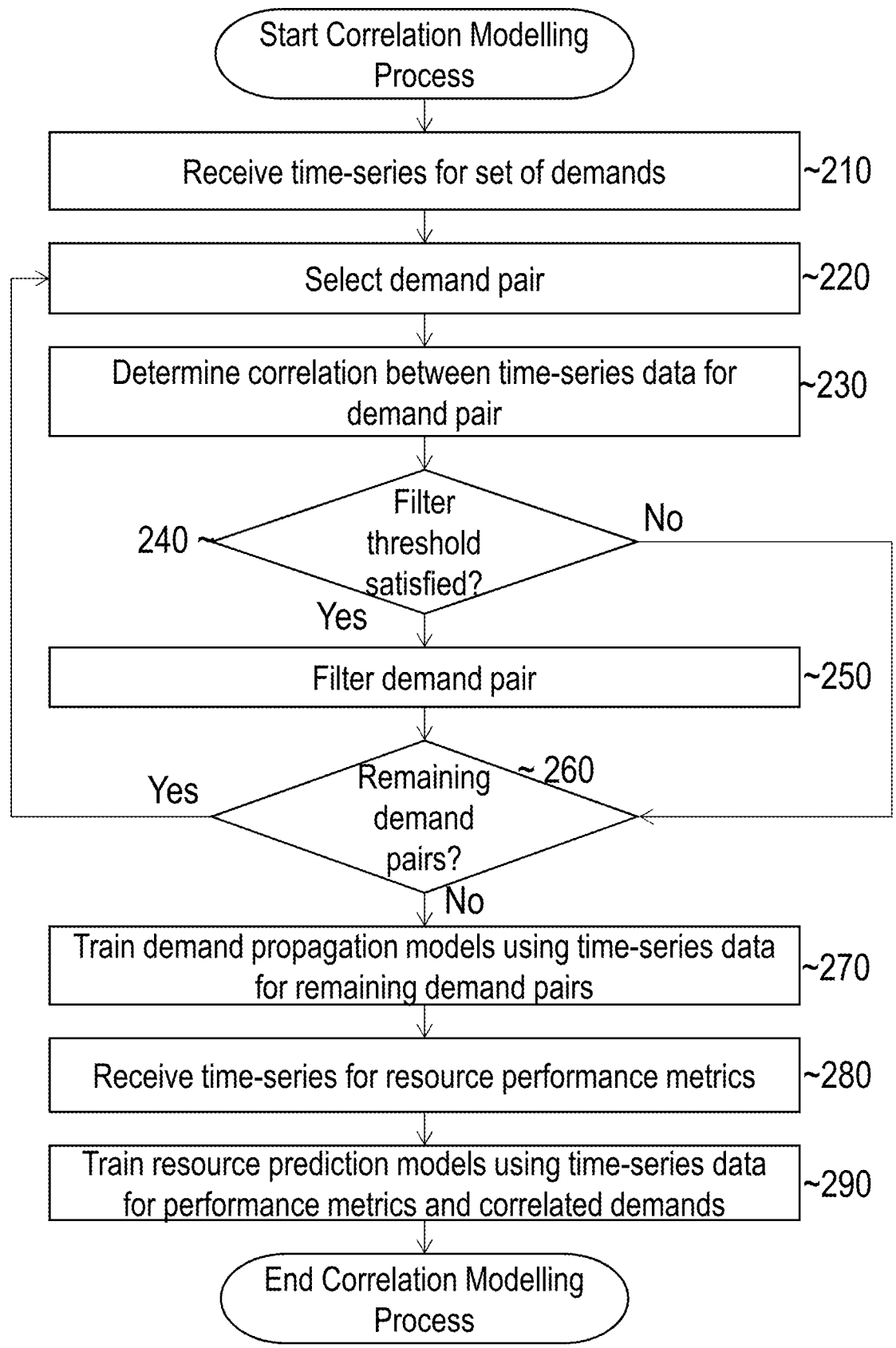
FIG. 2 illustrates an example set of operations for training a set of correlation prediction models, in accordance with one or more embodiments.

FIG. 2 illustrates an example set of operations for training a set of demand propagation and correlation prediction models, in accordance with one or more embodiments. The set of operations include receiving time-series data for a set of demands (Operation 210). For example, correlation modelling logic 132 may receive, from data collector 120, a sequence of data points capturing the number of instruction executions, transactions per second, redo records generated, function calls, and/or user calls per second for one or more of targets 112a-i. Additionally or alternatively, other demands may also be captured for analysis, depending on the particular implementation. As previously indicated, time-series data may be received on-demand, periodically, or on a streaming/continuous basis from data collector 120.

In one or more embodiments, the training set of time-series data is conditioned before analysis. For example, correlation modelling logic 132 may perform an hourly rollup and/or a time-alignment of different time-series dataset to compare values from the same hourly time-range. In other embodiments, values may be rolled up over a different time period (e.g., on a per minute basis, per half-hour, daily, etc.)

Before the training set of time-series data is used to train correlation prediction models, correlation modelling logic 132 analyzes different demands and filters out/removes demands that contain redundant information. Demand filtering reduces processing and storage overhead by eliminating the training and storage of redundant models. Demand filtering is described further below with reference to operations 220 to 260.

During the filtering phase, correlation modelling logic 132 selects a demand pair to analyze (Operation 220). For example, if the time series includes three inputs/demand on a system, $D_1$, $D_2$, and $D_3$, there are three possible demand pairs: $\{D_1, D_2\}$, $\{D_1, D_3\}$ and $\{D_2, D_3\}$. The demand pairs may be selected and processed n any order.

As part of the filtering phase, correlation modelling logic 132 next determines a correlation coefficient using the training set of time-series data for the selected demand pair (Operation 230). For example, a Pearson's correlation coefficient may be computed as follows:

$$p = \frac{\sum_{i=1}^{n}(d_i - \bar{d})(x_i - \bar{x})}{\sqrt{\sum_{i=1}^{n}(d_i - \bar{d})^2}\sqrt{\sum_{i=1}^{n}(x_i - \bar{x})^2}} \qquad (1)$$

where:
  d is a first demand time-series dataset including n values $\{d_1, \ldots, d_n\}$;
  x is a second demand time-series dataset including n values $\{x_1, \ldots, x_n\}$;
  $\bar{d}$ is the sample mean for the first demand time series, and
  $\bar{x}$ is the sample mean for the second demand time-series dataset.

Other methods of computing a correlation coefficient, such as spearman's rank correlation coefficient, may also be used, depending on the particular implementation.

Correlation modelling logic 132 next compares the correlation coefficient to a filter threshold to determine whether to filter one of the demands from the demand pair (Operation 240). The filter threshold may vary from implementation to implementation. In one or more embodiments, the filter threshold for the Pearson's correlation coefficient may be set at 0.99. A correlation coefficient this high indicates that the demands track each other very closely and may be treated as representing the same behavioral patterns. In other cases. a slightly lower correlation coefficient may be used to allow for a greater amount of deviation between the demands, thereby increasing the likelihood of filtering.

If the filter threshold is satisfied, then correlation modelling logic 132 removes one of the demands from the demand pair (Operation 250). Once removed, a demand is not used to train demand propagation models or resource prediction models. Instead, the demand propagation model and resource prediction model for the remaining demand in the demand pair may be applied to the removed demand since the demands are highly correlated.

Correlation modelling logic 132 next determines whether there are any demand pairs remaining (Operation 260). The determination may be made based on whether any demands were filtered. For example, in the above example with three demand pairs, if $\{D_1, D_2\}$ was analyzed and no demands were filtered, then there are two remaining demand pairs to analyzed: $\{D_1, D_3\}$ and $\{D_2, D_3\}$. On the other hand, if $D_2$ was filtered out, then only one demand pair is left to analyze: $\{D_1, D_3\}$. The process returns to operation 220 for each reaming demand pair.

Once all demand pairs have been processed, correlation modelling logic 132 trains a set of one or more demand propagation models for the remaining demand pairs (Operation 270). In one or more embodiments, correlation modelling logic 132 trains a demand propagation model by fitting a correlation prediction model to the observed data sets of each demand pair. Given demand pair {$D_1$, $D_2$}, for instance, a predictive model may be fit using linear regression as follows:

$$D_1 = D_2\beta + \epsilon_i \quad (2)$$

where
- $\beta$ is a parameter vector with elements that are partial derivatives; and
- $\epsilon_i$ represents an error term.

Linear regression may be used to compute a "best fit" line through the demand time-series data points. The best fit in this case is the line that most accurately represents the relationship between the demand pairs. The best fit may be determined by minimizing the sum of squared residuals, percentage of squared residuals, or according to any other linear regression estimation method. In other cases, nonlinear models may be trained to fit polynomials or other functions to the data points.

In one or more embodiments, demand propagation models are only trained for demand pairs if the correlation coefficient is above a threshold. The training threshold in this case may be set much lower than the filter threshold as no demand pairs remain with a correlation coefficient above the filter threshold. For example, a training threshold may be set at 0.25 or any other value, depending on the particular implementation. The training threshold may eliminate having to train/store demand propagation models for demands that have little to no correlation.

Figure 3A:
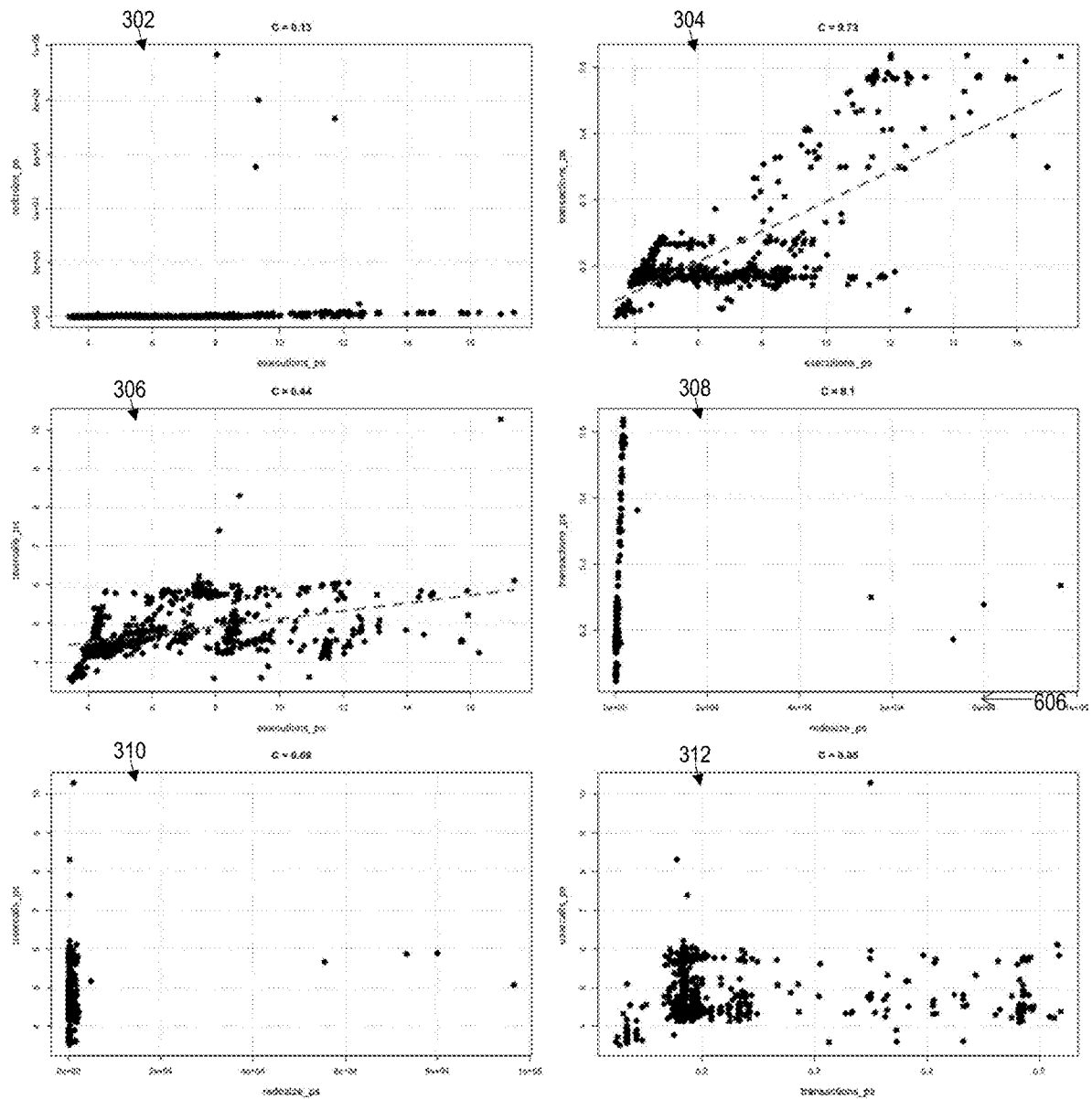
FIG. 3 illustrates an example set of demand propagation models, in accordance with one or more embodiments.
Figure 3B:
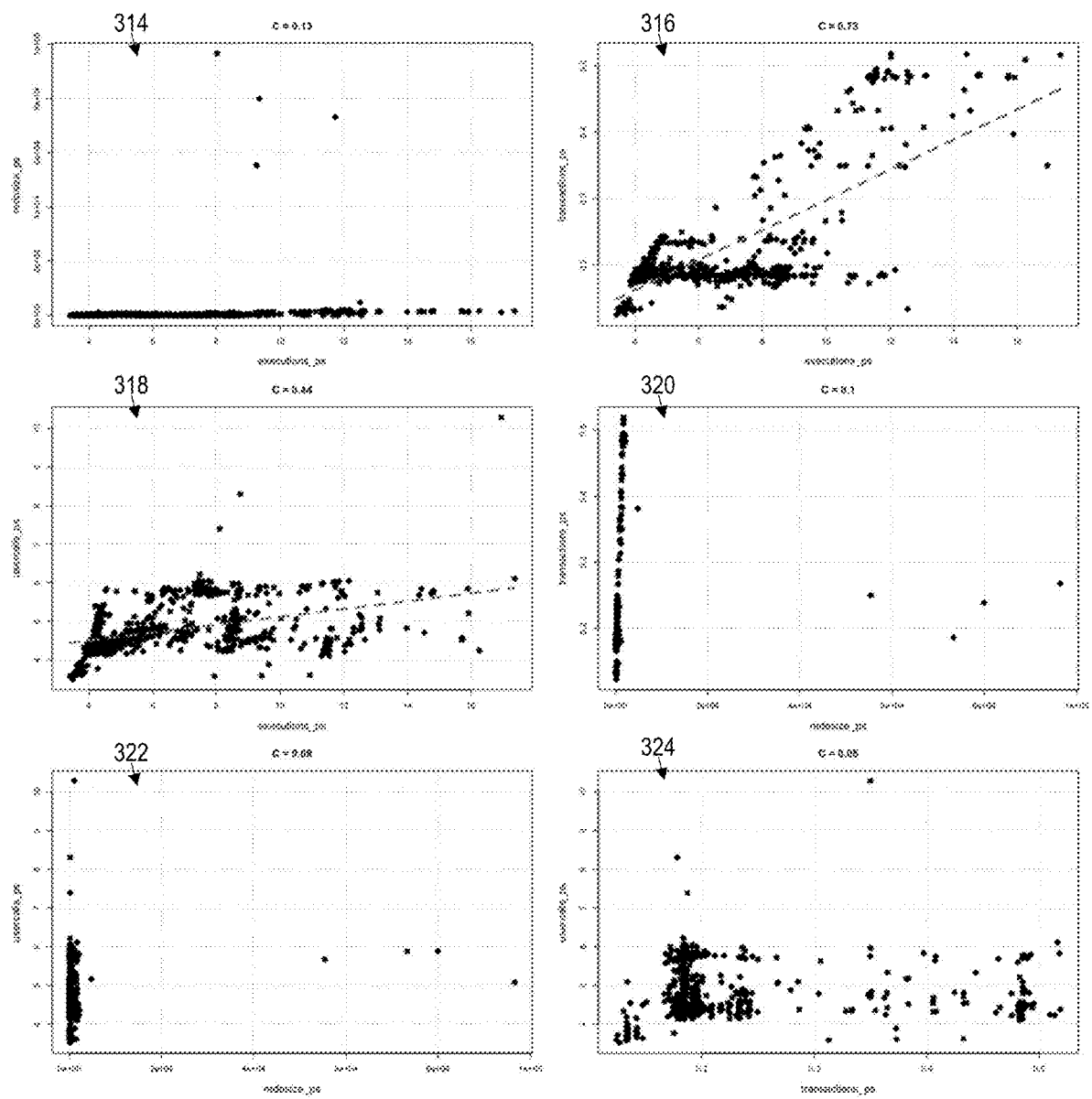

FIG. 3 illustrates an example set of demand propagation models, in accordance with one or more embodiments. In the example, demand propagation models are trained for demand pairs that have a correlation above a threshold (e.g., 0.25). Referring to the demand pairs:

Chart 302 depicts the correlation between the size of redo data generated per second and executions per second on a database host. The correlation coefficient is 0.13, which is below the threshold. Thus, no demand propagation model is trained.

Chart 304 depicts the correlation between transactions per second and executions per second on a database host. The correlation is 0.73, which is above the threshold. Thus, a demand propagation model is fit to the data points.

Chart 306 depicts the correlation between user calls per second and executions per second on the database host. The correlation is 0.44, which is above the threshold. Thus, a demand propagation model is fit to the data points.

Chart 308 depicts the correlation between transactions per second and redo data generated per second on a database host. The correlation coefficient is 0.1, which is below the threshold. Thus, no demand propagation model is trained.

Chart 310 depicts the correlation between the number of user calls per second and the size of redo records generated per second on a database host. The correlation coefficient is 0.08, which is below the threshold. Thus, no demand propagation model is trained.

Chart 312 depicts the correlation between user calls per second and transactions per second on a database host. The correlation coefficient is 0.05, which is below the threshold. Thus, no demand propagation model is trained.

Returning again to FIG. 2, the process includes receiving time-series datasets for resource performance metrics (Operation 280). For example, correlation modelling logic 132 may receive a sequence of samples that track CPU utilization, memory bandwidth, I/O operations, and/or other performance metric over time. The resource performance metrics may be received at any point in the process on demand, periodically, or on a streaming basis. Upon receipt, the resource performance metrics may be conditioned as previously described.

Using the time-series data for the remaining demands and the resource performance metrics, correlation modelling logic 132 trains a set of resource prediction models (Operation 290). In one or more embodiments, correlation modelling logic 132 trains a resource prediction model by fitting a correlation prediction model to the observed data sets of a demand, resource metric pairing. Given demand-resource pair {$D_1$, $R_1$}, for instance, a predictive model may be fit using linear regression as follows:

$$R_1 = D_1\beta + \epsilon_i \quad (3)$$

where
- $\beta$ is a parameter vector with elements that are partial derivatives; and
- $\epsilon_i$ represents an error term.

Linear regression may be used to compute a "best fit" line through the demand and resource time-series data points. The best fit in this case is the line that most accurately represents the relationship between the demand and resource performance. The best fit may be determined by minimizing the sum of squared residuals, percentage of squared residuals, or according to any other linear regression estimation method. In other cases, nonlinear models may be trained to fit polynomials or other functions to the data points.

In one or more embodiments, resource prediction models are only trained for demand-to-resource pairs if the correlation coefficient is above a threshold. For example, a training threshold may be set at 0.25, as above for the demand propagation models, or any other value, depending on the particular implementation. The training threshold may eliminate having to train/store resource prediction models for demands that have little to no correlation.

Figure 4:
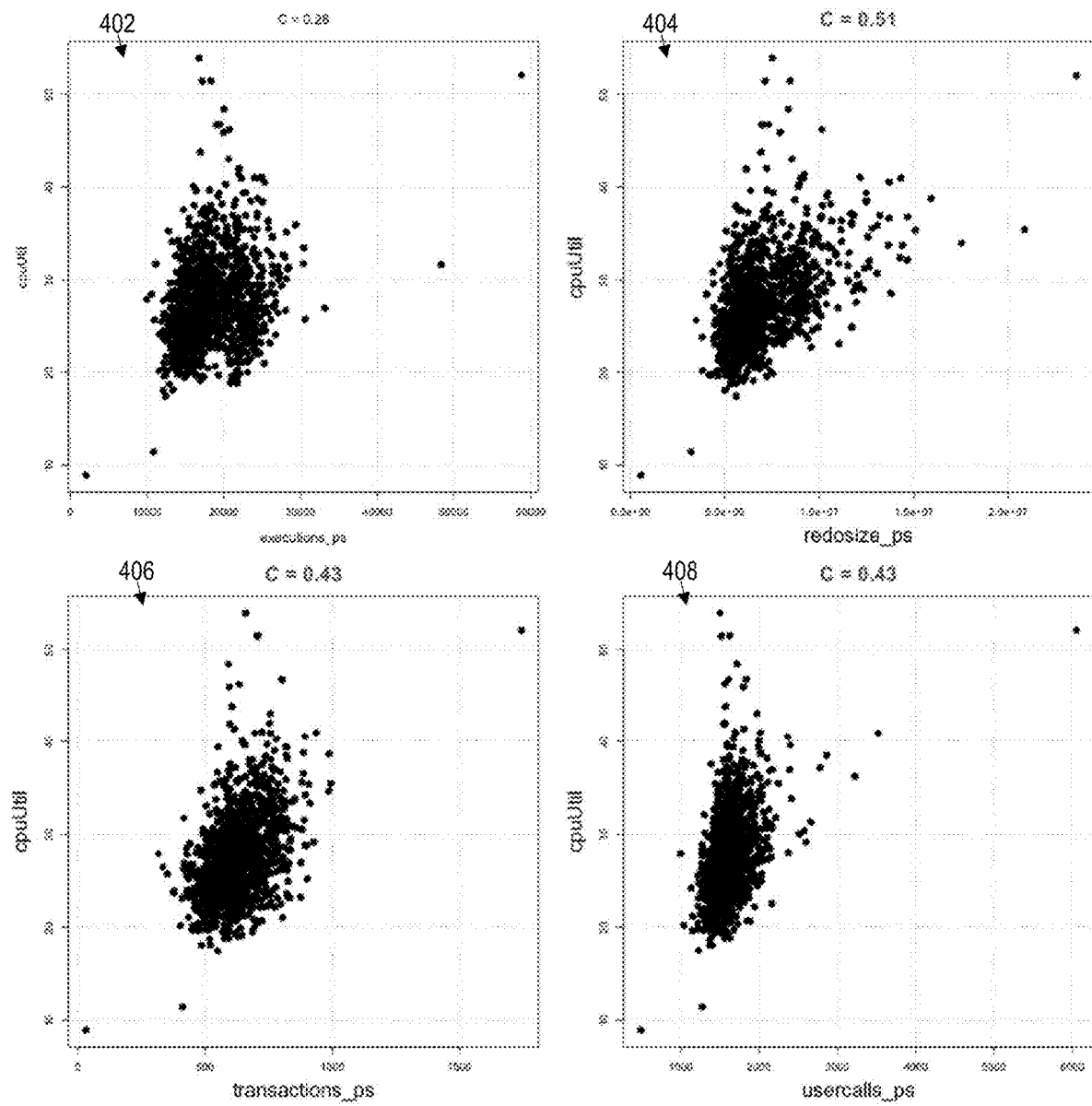
FIG. 4 illustrates an example set of correlation prediction models, in accordance with one or more embodiments.

FIG. 4 illustrates an example set of resource prediction models, in accordance with one or more embodiments. In the example, resource prediction models are trained for resource-to-demand pairings that have a correlation above a threshold (e.g., 0.4). Referring to the pairings:

Chart 402 depicts the correlation between CPU utilization and executions per second on a database host. The correlation coefficient is 0.28, which is below the threshold. Thus, no resource prediction propagation model is trained.

Chart 404 depicts the correlation between CPU utilization and redo size generated per second on a database host. The correlation is 0.51, which is above the threshold. Thus, a resource prediction model is fit to the data points.

Chart 406 depicts the correlation between CPU utilization and transactions per second on a database host. The correlation is 0.43, which is above the threshold. Thus, a resource prediction model is fit to the data points.

Chart 408 depicts the correlation between CPU utilization and user calls per second on a database host. The correlation coefficient is 0.43, which is above the threshold. Thus, a resource prediction model is fit to the data points.

As depicted in FIG. 4, host CPU utilization is a function of redo size, transaction, and user calls per second. In other cases, CPU utilization may be a function of other demands in addition or as an alternative to those listed. Correlation modelling logic 132 may select demands during runtime to predict each resource. The selected demands may be adjusted over time as additional correlation patterns are detected. If no demand is correlated to a given resource metric, then correlation modelling logic 132 may proceed without training a resource prediction model for the given resource performance metric.

4. Seasonal-Aware Simulation Models

Correlation patterns may vary between different seasons. A season in this context refers to pattern that recurs periodically. In a database host, for instance, daily high seasons for transactions may be observed between the hours of 9 to 5 from Monday to Friday. Daily low seasons may occur outside of these hours. In other cases, seasonal high, lows, and/or other patterns may recur on an hourly, weekly, monthly, yearly, or holiday basis. As previously described, the daily highs in transactions may correlate with a high CPU utilization rate. However, daily lows may not be closely correlated with the CPU utilization rate as batch processes may be run in the evenings on the database host. In other cases, seasonal lows may follow a different correlation pattern than the daily highs. Therefore, training different correlation models (e.g., demand propagation and resource prediction models) for different resources may lead to more accurate representations.

In one or more embodiments, seasonality modelling logic 134 builds a seasonal classification model that represents different seasonal patterns. For example, the seasonal classification model may cluster time-series data points that are associated with different seasonal pattern classifications. The seasonal pattern classifications and clusters may then be provided to correlation modelling logic 132. In response, correlation modelling logic 132 may build demand propagation models and/or resource prediction models, as previously described, for the data points belonging to each cluster. In other words, separate models are trained and build for each cluster.

Correlation prediction models for a set of demands and resources may vary between different clusters/seasonal pattern classifications. For example, CPU utilization may be a function of transactions, user calls, and redo logs generated per second in the high season. In the low season, CPU utilization may only be a function of executions per second. In other words, the correlation coefficients between a particular demand and resource pair may vary from one season to the next. As a result, correlation modelling logic 132 may select different demands to train resource prediction models for different seasonal patterns.

Figure 5:
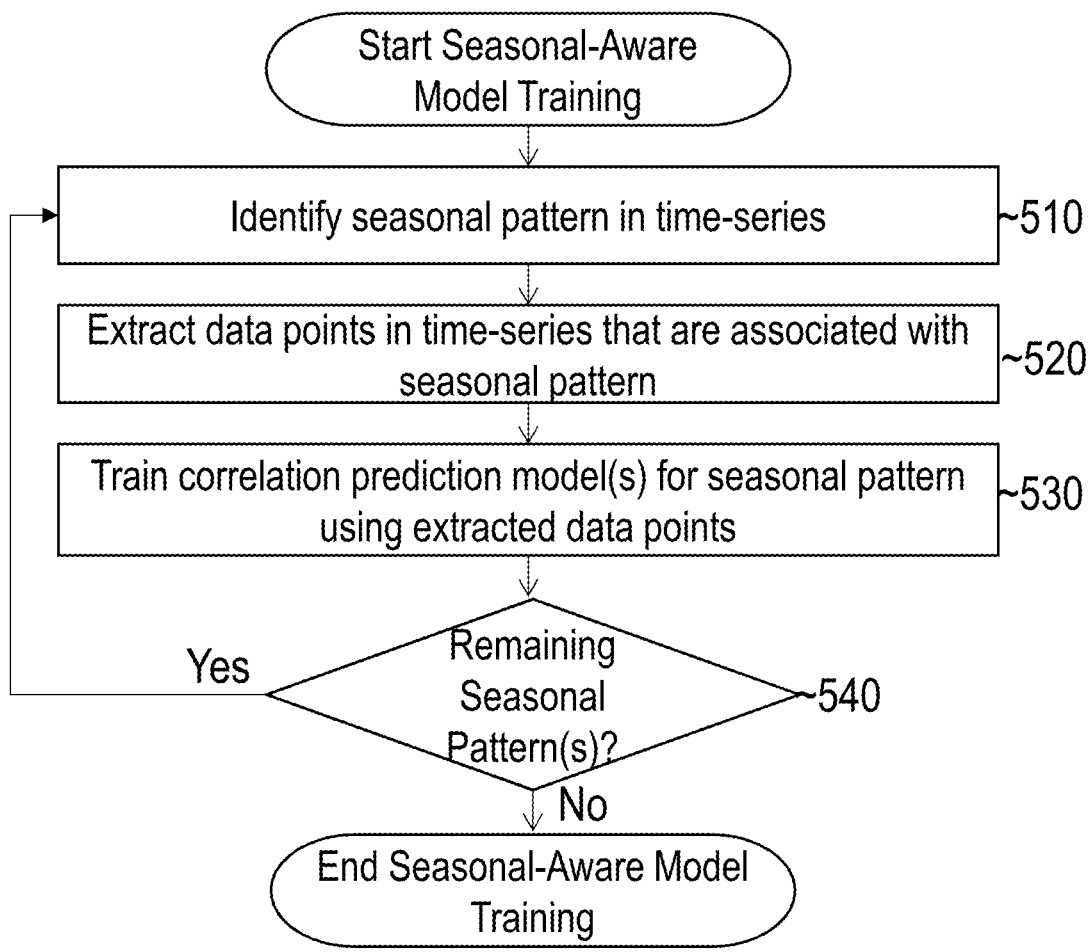
FIG. 5 illustrates an example set of operations for performing seasonal aware training of simulation models, in accordance with one or more embodiments.

FIG. 5 illustrates an example set of operations for performing seasonal aware training of simulation models, in accordance with one or more embodiments. The process includes identifying seasonal patterns in a time-series (Operation 510). For example, seasonal modelling logic 134 may classify different sub-periods/instances of a resource and/or demand time-series as sparse high for those instances that exhibit sharp, relatively short bursts on a recurring basis. Other classifications may include, but are not limited to, dense highs, sparse lows, and dense lows. Example techniques for classifying seasonal patterns are described in U.S. application Ser. No. 15/266,971, entitled "SEASONAL AWARE METHOD FOR FORECASTING AND CAPACITY PLANNING"; U.S. Provisional Patent Appln. No. 62/301,585, entitled "METHOD FOR CREATING PERIOD PROFILE FOR TIME-SERIES DATA WITH RECURRENT PATTERNS"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; U.S. application Ser. No. 15/057,062, entitled "UNSUPERVISED METHOD FOR CLASSIFYING SEASONAL PATTERNS"; and U.S. Provisional Patent Appl. No. 62/370,880, entitled "UNSUPERVISED METHOD FOR BASELINING AND ANOMALY DETECTION IN TIME-SERIES DATA FOR ENTERPRISE SYSTEMS", previously incorporated by reference.

Responsive to identifying a seasonal pattern, seasonality modelling logic 126 extracts data points in the time series that belong to the seasonal pattern (Operation 520). For example, if a high season for resource utilization is identified to recur weekly on Mondays from 9 to noon, then data points captured during this time frame may be clustered or otherwise grouped together within data repository 140.

Once extracted, correlation modelling logic 132 uses the data points to train a set of one or more correlation prediction models for the seasonal pattern (Operation 530). For example, correlation modelling logic 132 may generated demand propagation models and/or resource prediction models as previously described.

The process next determines whether there are any remaining seasonal patterns to analyze (Operation 540). If so, then the process repeats for the next selected seasonal patterns. Thus, correlation prediction models may be generated for each respective seasonal pattern. For example, if sparse high, dense high, and low seasonal patterns were identified, then the process may repeat for each of these seasonal pattern classifications. After correlation prediction models have been trained for each seasonal pattern, the process ends.

As can be seen from the process in FIG. 5, different sets of data points may be used to train correlation prediction models associated with different respective seasonal patterns. For example, for a high season, data points from a first set of one or more sub-periods (e.g., Monday to Thursday 9a.m. to 4p.m.) may be extracted to train the correlation prediction model. Data points from a different set of one or more sub-periods may be used to train correlation prediction models for other seasonal patterns, such as a low season.

Figure 6:
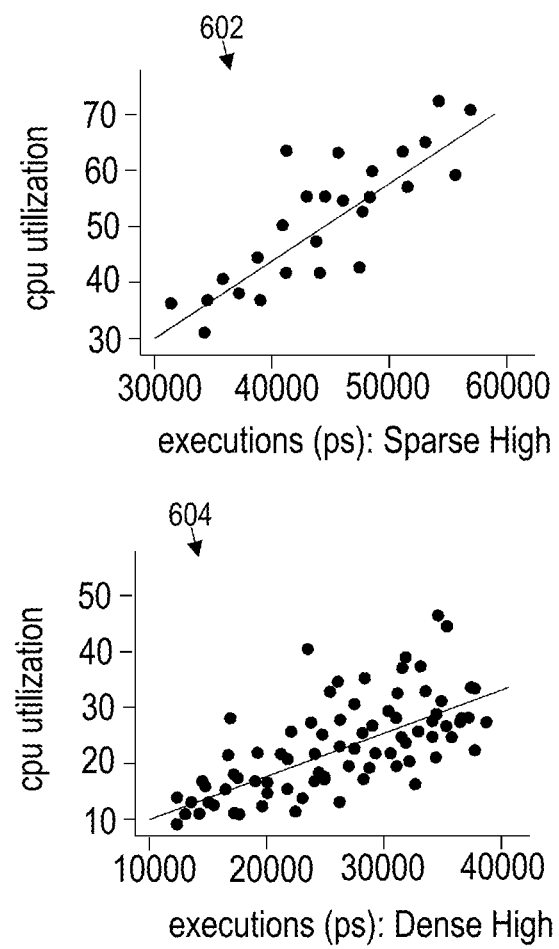
FIG. 6 illustrates an example set of seasonal-aware correlation prediction models, in accordance with one or more embodiments.

FIG. 6 illustrates an example set of seasonal-aware correlation prediction models, in accordance with one or more embodiments. Chart 602 depicts a resource prediction model the maps values of executions per second to CPU utilization rates in the sparse high season. A best fit line is generated using time-series samples from the sparse high season. Chart 604 depicts a resource prediction model that maps values of executions per second to CPU utilization rates in the dense high season. As can be seen, the resource prediction model that is fit to the data has a different slope than in the sparse high season.

In one or more embodiments, data repository 140 stores a mapping between seasonal patterns and the corresponding set of trained correlation prediction models. During the evaluation phase, described n further detail below, the mapping data may be accessed to determine which correlation prediction models to use for a given scenario. For example, a scenario may be defined as follows "What if my system saw X times more transactions in the high season". In response, what-in analytic 138 may determine which correlation prediction models are associated with the high season by reading the mapping data. What-if analytic 138 may use the associated correlation prediction models to generate the scenario output. In other cases, a scenario may apply to multiple seasons. For example, a general scenario of "What if my system saw X times more transactions" may apply across all seasons. In this case, what-if analytic 138 may analyze each season independently and stitch together the results.

5. Historical Scenario Simulations

In one or more embodiments, what-if analytic 138 is configured to perform historical what-if scenario simulations. With historical simulations, modifications are made to historical time-series data to see how the system would have behaved. One benefit of adjusting historical data is that what-if analytic 138 is able to provide the user with scenario outputs that span the distribution of known operating modes. Historical simulations may be performed with no inferences about future conditions. In other words, a historical simulation may be performed without having to generate a forecast.

Figure 7:
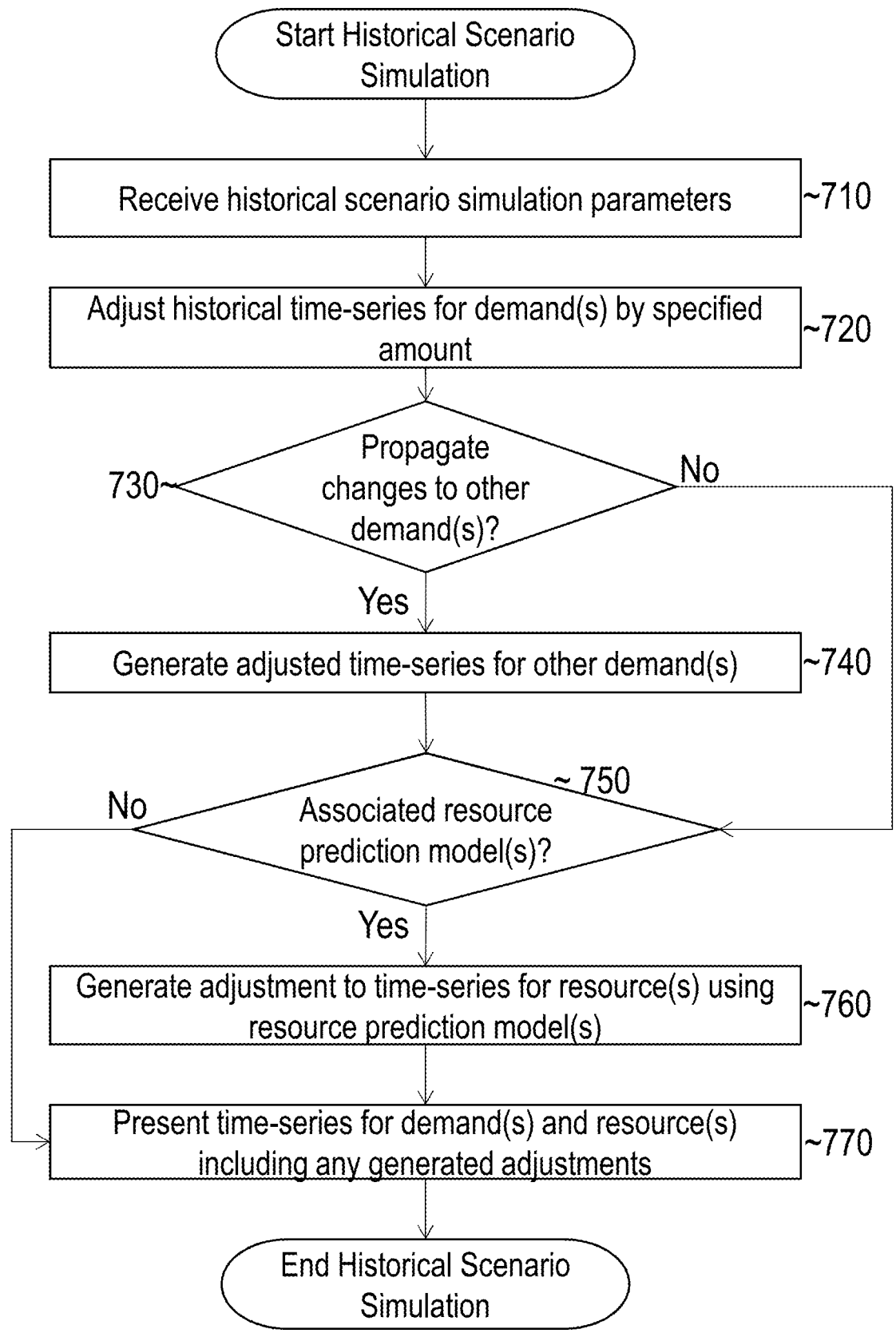
FIG. 7 illustrates an example set of operations for simulating a historical scenario, in accordance with one or more embodiments.

FIG. 7 illustrates an example set of operations for simulating a historical scenario, in accordance with one or more embodiments. The process includes receiving a set of historical simulation parameters (Operation 710). In one or more embodiments, the scenario parameters define a historical adjustment. For example, an example historical simulation scenario may be defined as "What if there were three times the amount of users in the last three months?" As another example, a historical simulation scenario may be defined as "What if there were ten percent more transactions last week?" In both examples, the scenario defines a historical adjustment and a period in the past to analyze. In other cases, a default timeframe to analyze may be chosen rather than explicitly defined. For example a user may submit a scenario definition as follows "What if there were ten percent more transactions on database host DBHost?" In this scenario definition, the user identifies an adjustment/modification and a particular target resource, but does not define the timeframe. Any default timeframe (e.g., the past week, month, six months, etc.) may be selected for analysis in this case.

Once the scenario parameters have been submitted, what-if analytic 138 adjusts one or more demands by a prescribed amount (Operation 720). For example, if the scenario requests a simulation of a historical scenario with three times more transactions, then what-if analytic 138 may adjust the transaction time-series data collected from one or more of targets 112a-i to treble the values. Adjustments may be made to values over a prescribed or default timeframe, depending on the particular implementation.

In one or more embodiments, the adjustments that are made by what-if analytic 138 vary depending on whether the scenario is attempting to model a user change or not. If the scenario defines a user change, then what-if analytic 138 models the user change by adjusting all of the demands by a prescribed amount. For example, if a scenario requests a simulation of four times change in users, then what-if analytic may adjust all demands by four times. If the scenario is more particular and adjusts a single demand, then the process may start by adjusting the prescribed demand by the prescribed amount. What-if analytic 138 may access the relevant demand propagation models to predict how the adjusted demand would propagate to other related demands, as described in the operations below.

During the historical simulation, what-if analytic 138 determines whether to propagate changes to a prescribed demand to other demands (Operation 730). As previously indicated, adjustments may be propagated if the scenario is making adjustments to individual demands rather than user changes. If the scenario is defining a user change, then the adjustment may be applied across all demands, and the process may skip to Operation 750. If the adjustment is to a prescribed demand or set of demands, then what-if analytic 138 may determine whether there are any associated demand propagation models involving the adjusted demand. For instance, a trained demand propagation model may be available if the adjusted demand was correlated more than the training threshold with another demand. Conversely, a trained demand propagation may not be available for the adjusted demand if the demand is not correlated with other demands.

If a trained demand propagation model is available, then what-if analytic 138 use the demand propagation model to propagate the adjustment to other, related demands. (Operation 740). For example, an adjusted execution per second value may be mapped to a corresponding value for transactions per second using the demand propagation model depicted in chart 304. The demand propagation model is also reversible, such that a change in transactions per second may be mapped to a corresponding execution value. Similarly, an adjustment in the number of executions per second may be mapped to a corresponding adjustment in user calls per second, and vice versa, using chart 306.

Once the adjustments to the demands are complete, what-if analytic determines 138 whether there are any resource prediction models associated with the adjusted demands (Operation 750). For example, what-if analytic 138 may search data store 140 for a trained resource prediction model that maps an adjusted demand to a resource performance metric. In some cases, a resource prediction model may not be available. This scenario may occur if none of the adjusted demands are correlated with a relevant resource performance metric. If none of the adjusted demands are correlated to resource performance, then the process may proceed without making any adjustments to a resource performance metric.

If a resource prediction model is available, then what-if analytic 138 may use the resource prediction model to generate an adjustment to at least one resource performance time-series (Operation 760). For example, a resource prediction model may map an adjusted value for executions per second to a corresponding CPU utilization value. What-if analytic 138 may adjust the historical CPU utilization rate to the value mapped to the adjusted executions per second value.

In one or more embodiments, an adjustment to a resource performance metric may be determined based on multiple resource prediction models. For example, one resource prediction model may map an adjusted value for transactions per second to an adjusted CPU utilization rate. A second model may map an adjusted redo size per second to an adjusted CPU utilization rate. A final adjustment may be computed by combining (e.g., through averaging or otherwise aggregating) the adjustments from the different resource prediction models.

In one or more embodiments, adjustments may be performed based on seasonal pattern classifications. For example, if a historical simulation is being run for a prescribed seasonal pattern (e.g., a high season, sparse high, low season, etc.), then what-if analytic 138 may search data store 140 for a mapping between the prescribed season seasonal pattern and a corresponding set of resource prediction models. What-if analytic 138 may then select/use one or more resource prediction models to map adjusted demand values to adjusted resource performance values for the prescribed seasonal pattern. In the event that the simulation spans multiple seasons, the models may be isolated to regions of time based on collective seasons. For example, the resource prediction model depicted in chart 602 may be used to map adjustments to executions per second in the sparse high season to corresponding adjustments to CPU utilization rate. For adjustments in the dense high season, the resource prediction model depicted n chart 604 may be used.

Once the evaluation phase is complete, what-if analytic 138 presents the time-series datasets for one or more demands and one or more resources, including any generated adjustments (Operation 770). The presentation of the adjusted time-series datasets may vary from implementation to implementation. For example, the time-series datasets may be displayed via an interactive display that is coupled to a client computing system. The interactive display may allow a user to drill down to view adjustments to individual demands, resources, or custom groups of demands and/or resources.

In one or more embodiments, an interactive display presenting the results of a historical simulation may allow a user to select responsive actions, including on or more of the responsive actions previously described, for the system to perform. For example, system 100 may adjust the configurations of 112*a-i*, deploy additional resources, and/or perform load balancing to replicate a simulated scenario.

In one or more embodiments, what-if analytic 138 may present an uncertainty interval for a historical simulation. An uncertainty interval may be a visualization or other indication of a degree of uncertainty in the predicted adjustments. For example, during training, correlation modelling logic 132 may calculate and cache the uncertainties for possible combinations of evaluation. For a model that maps demand X to resource (or demand) Y, these possibilities include the uncertainty of predicting Y from X and predicting X from Y.

In one or more embodiments, the uncertainty interval is a range of values that include an upper limit and a lower limit within which at least a certain threshold of values falls within a given level of confidence. For example, a historical CPU utilization rate may be observed to be 50 percent. In response to an adjustment of three times the amount of users, the projected/adjusted CPU utilization rate may jump to 65% (these values are given by way of example only and may vary from system to system). Based on historical patterns, the lower limit of the uncertainty level may be 55%, and the upper limit may be 75% with 95% confidence. The uncertainty interval thus gives a range of expected values within a prescribed level of confidence.

Figure 8A:
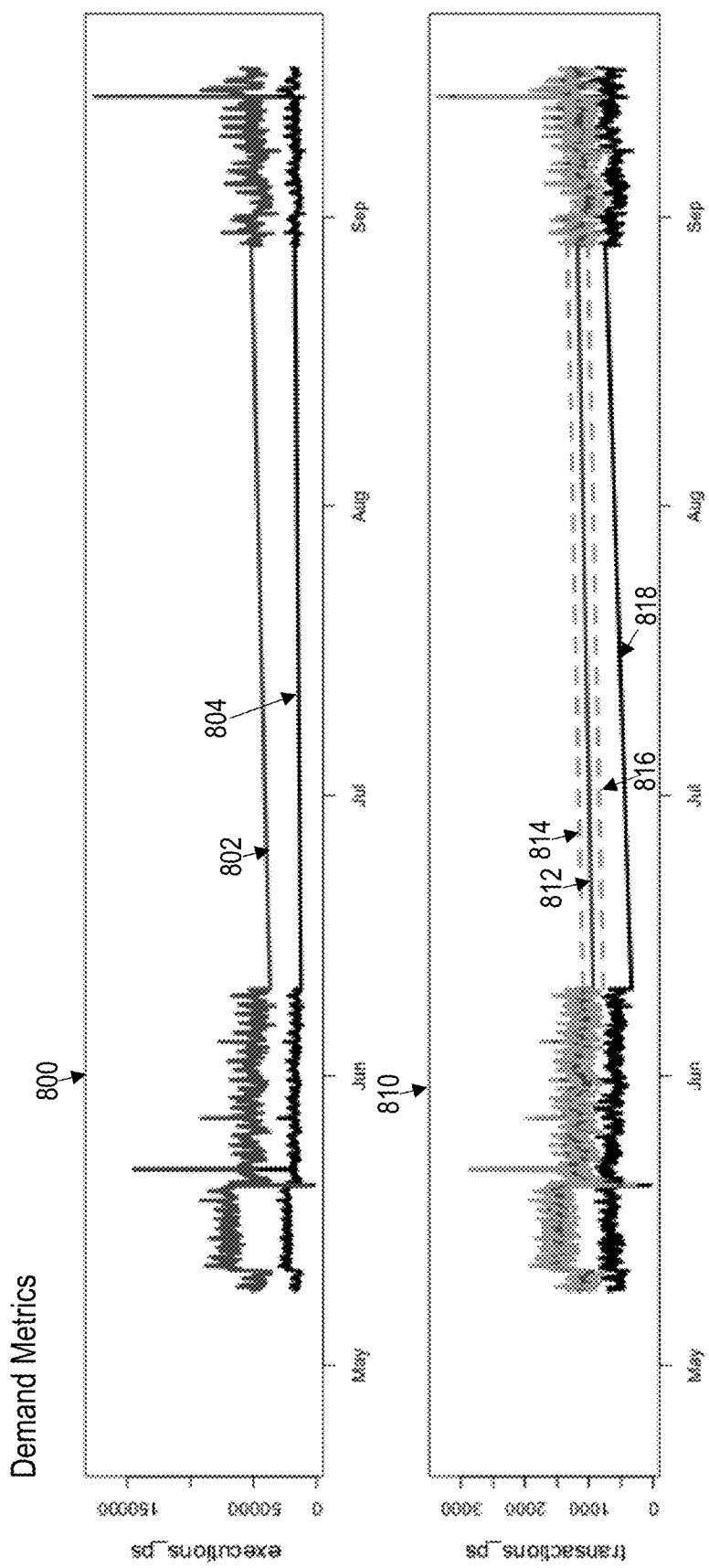
FIG. 8A illustrates an example presentation of propagating adjustments in one demand to another demand, in accordance with one or more embodiments.

FIG. 8A illustrates an example presentation of propagating adjustments in one demand to another demand, in accordance with one or more embodiments. The scenario parameters for this simulation may be defined as follows: "What if may system saw three times more executions per seconds in the last five months?" Based on the simulation, what-if analytic 138 may present chart 800, which illustrates an adjustment to a historical time-series for executions per second. Time-series plot 804 depicts historical executions per second that were performed between May and September. Time-series plot 802 depicts an example adjustment that increases the number of executions by three times.

What-if analytic 138 may further present chart 810 as part of the historical simulation. Time-series plot 818 depicts historical transactions per second that were performed between May and September. Using a demand propagation model, the transactions per second are adjusted based on the three times increase in executions per second. Time-series plot 812 depicts the adjustment. Plot 814 depicts an upper bound for the uncertainty interval, and plot 816 depicts a lower bound for the uncertainty interval.

Figure 8B:
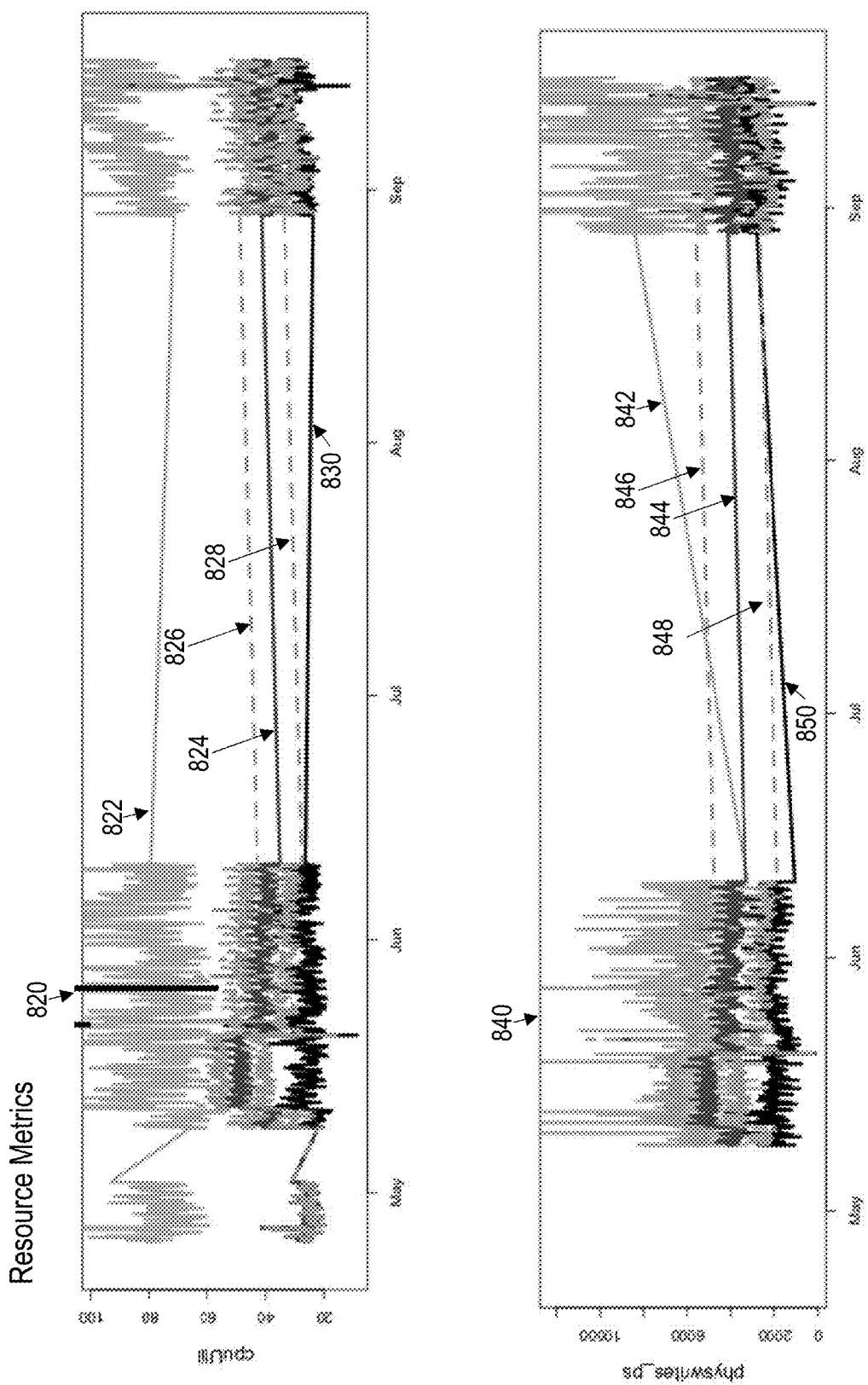
FIG. 8B illustrates an example presentation of adjustments generated for resource time-series during a historical simulation, in accordance with one or more embodiments.

FIG. 8B illustrates an example presentation of adjustments generated for resource time-series during the historical simulation defined with reference to FIG. 8A. Chart 820 depicts the historical CPU utilization rate (time-series plot 830). Chart 820 further depicts a projected/adjusted CPU utilization rate (time-series plot 824) computed based on the three time increase to executions per second using a resource prediction model. Plot 826 depicts the upper bound in the uncertainty interval, and plot 828 depicts the lower bound. Time-series plot 822 depicts three times the CPU utilization rate, which may be omitted from the scenario output but is shown for purposes of illustration. As can be seen, the projected CPU utilization is much lower than multiplying the CPU utilization rate by the same amount as the increase in executions per second. The training of time-series models as previously described allows for a much more complex and meaningful analysis between the various interactions between demands and resource performance.

Chart 840 depicts the historical number of physical writes per second (time-series plot 850). Chart 840 further depicts a projected/adjusted number of physical writes per second (time-series plot 844) based on the adjusted demands. Plot 846 depicts the upper bound of the uncertainty interval, and plot 848 depicts the lower bound of the interval. Time-series plot 842 depicts three times the historical physical writes per second rate, which, as can be seen, is inaccurate in comparison to the adjusted value, which uses the trained models to account for complex interactions within the system.

6. Forecast Scenario Simulations

In one or more embodiments, what-if analytic 138 is configured to perform forecast what-if scenario simulations. With forecast scenario simulations, modifications may be made to historical and/or forecast time-series data to see how the system is predicted to behave. In contrast to historical simulations, forecast simulations include modelling changes in future demands and/or resources. The adjustments may account for changes, trends, and seasonal patterns as determined from historical data collected from targets 112*a-i*.

Figure 9:
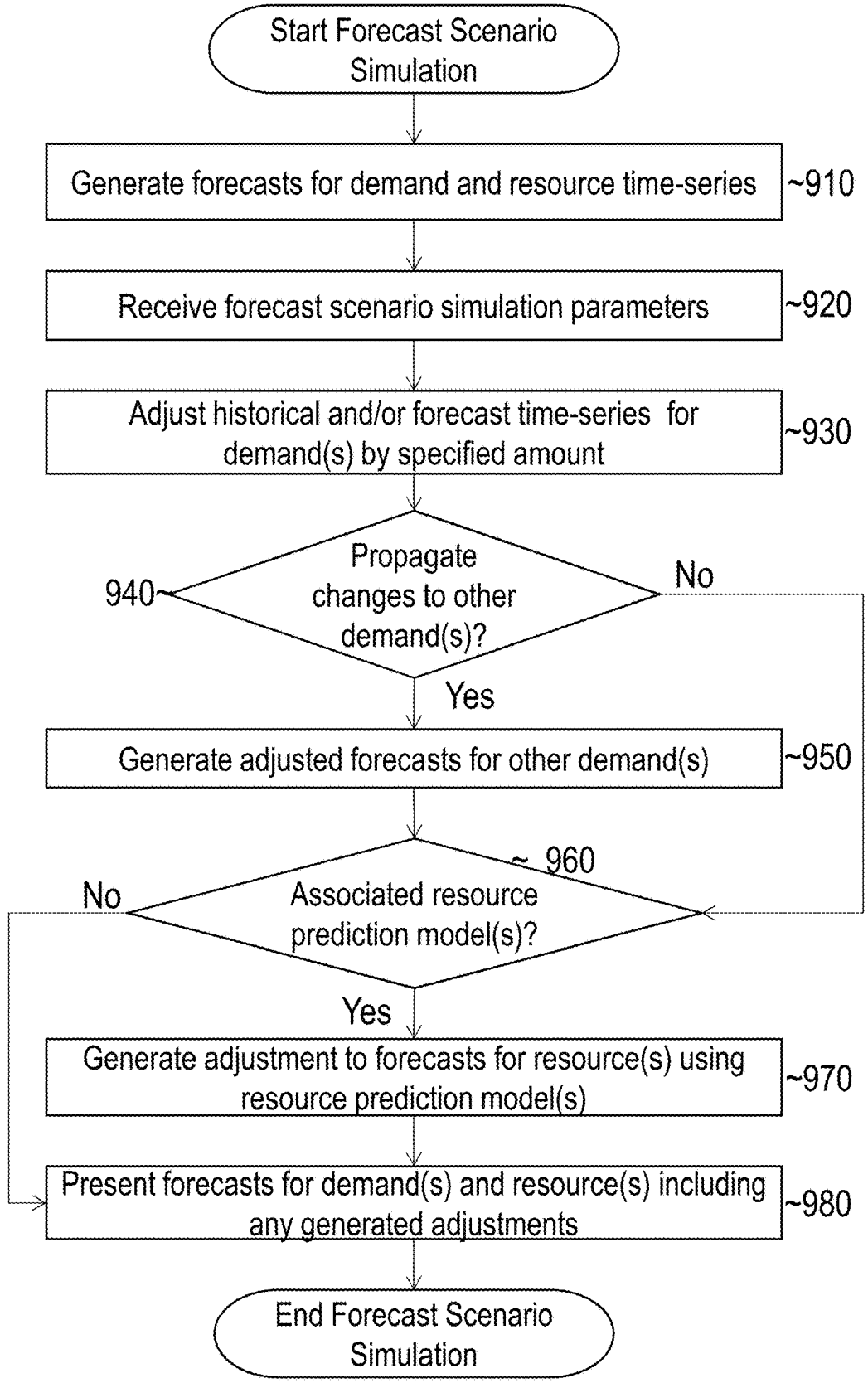
FIG. 9 illustrates an example set of operations for simulating a forecast scenario, in accordance with one or more embodiments.

FIG. 9 illustrates an example set of operations for simulating a forecast scenario, in accordance with one or more embodiments. The set of operations includes generating a set of forecasts for each demand and resource time-series (Operation 910). In one or more embodiments, forecast modelling logic 136 is configured to generate a forecast that account for seasonal patterns and trends in the time-series data. For example, forecast modelling logic 136 may generate an Additive or Multiplicative Holt-Winters forecasting model. The Holt-Winters models and other example forecasting models that may be trained are described in U.S. application Ser. No. 15/266,971, entitled "SEASONAL AWARE METHOD FOR FORECASTING AND CAPACITY PLANNING", previously incorporated by reference.

The process further includes receiving a set of forecast simulation parameters (Operation 920). In one or more embodiments, the scenario parameters define a future adjustment. For example, an example forecast simulation scenario may be defined as "What if there are three times the amount of forecasted users in the next three months?" As another example, a historical simulation scenario may be defined as "What if there are ten percent more transactions than forecasted for next week?" In both examples, the scenario defines an adjustment to a forecasted value and a period in the future to analyze. In other cases, a default timeframe to analyze may be chosen rather than explicitly defined. For example a user may submit a scenario definition as follows "What if there are ten percent more transactions on database host DBHost than forecasted?" In this scenario definition, the user identifies an adjustment/modification and a particular target resource, but does not define the timeframe. Any default timeframe (e.g., the next week, month, six months, etc.) may be selected for analysis in this case.

Responsive to receiving the forecast scenario parameters, what-if analytic 138 adjusts a historical and/or forecasted value by a prescribed amount (Operation 930). For example, if the scenario requests a simulation of a scenario with three times more transactions than forecasted, then what-if analytic 138 may adjust the forecast for future transactions per second projected for targets 112a-i to treble the values. Adjustments may be made to values over a prescribed or default timeframe, depending on the particular implementation.

During the forecast scenario simulation, what-if analytic 138 determines whether to propagate changes to the prescribed one or more demands to other demands (Operation 940). Similar to the historical simulation, adjustments may be propagated if the scenario is making adjustments to individual demands rather than user changes. If the scenario is defining a user change in the future, then the adjustment may be applied across all demands, and the process may skip to Operation 960. If the adjustment is to a prescribed demand or set of demands, then what-if analytic 138 may determine whether there are any associated demand propagation models involving the adjusted demand(s) as described above for in the historical scenario simulation.

If a trained demand propagation model is available, then what-if analytic 138 use the demand propagation model to propagate the adjustment to other, related demands. (Operation 950). For example, an adjusted forecast for executions per second may be mapped to an adjusted forecast for transactions per second using the demand propagation model depicted in chart 304. The mapped values in this case incorporate the trend and seasonal factors from the forecast. The demand propagation models, as well as the resource prediction models, are also reversible as previously described.

Once the adjustments to the demand forecasts are complete, what-if analytic determines 138 whether there are any resource prediction models associated with the adjusted demands (Operation 960). For example, what-if analytic 138 may search data store 140 for a trained resource prediction model that maps an adjusted demand to a resource performance metric. In some cases, a resource prediction model may not be available. This scenario may occur if none of the adjusted demands are correlated with a relevant resource performance metric. If none of the adjusted demands are correlated to resource performance, then the process may proceed without making any adjustments to a resource performance metric.

If a resource prediction model is available, then what-if analytic 138 may use the resource prediction model to generate an adjustment to at least one resource performance time-series (Operation 970). For example, a resource prediction model may map an adjusted value for executions per second to a corresponding CPU utilization value. What-if analytic 138 may adjust a forecast CPU utilization rate to the value mapped to the adjusted executions per second value. Similar to the demand adjustments, the resource performance adjustments may incorporate the trend and/or seasonal factors of the forecast.

As with the historical simulation, an adjustment to a forecast resource performance metric may be determined based on multiple resource prediction models. Additionally or alternatively, adjustments may be performed based on seasonal pattern classifications. For example, if a historical simulation is being run for a prescribed seasonal pattern (e.g., a high season, sparse high, low season, etc.), then what-if analytic 138 may search data store 140 for a mapping between the prescribed season seasonal pattern and a corresponding set of resource prediction models. What-if analytic 138 may then select/use one or more resource prediction models to map adjusted demand forecasts to adjusted resource performance forecasts for the prescribed seasonal pattern. In the event that the simulation spans multiple seasons, the models may be isolated to regions of time based on collective seasons.

Once the evaluation phase is complete, what-if analytic 138 presents the time-series datasets for one or more demand forecasts and one or more resource performance forecasts, including any generated adjustments (Operation 980). The presentation of the adjusted time-series datasets may vary from implementation to implementation. For example, the time-series datasets may be displayed via an interactive display that is coupled to a client computing system. The interactive display may allow a user to drill down to view adjustments to individual demands, resources, or custom groups of demands and/or resources.

In one or more embodiments, an interactive display presenting the results of a forecast scenario simulation may allow a user to select responsive actions, including on or more of the responsive actions previously described, for the system to perform. For example, system 100 may adjust the configurations of 112a-i, deploy additional resources, and/or perform load balancing to replicate a simulated scenario.

As with the historical simulation, what-if analytic 138 may present an uncertainty interval for a historical simulation. However, in the case of a forecast scenario simulation, the original forecast may already be associated with an uncertainty interval, as opposed to historical observations. During training, forecast modelling logic 136 and/or correlation modelling logic 132 may calculate and cache the uncertainties for possible combinations of evaluation. For a model that maps demand X to resource (or demand) Y, these possibilities include the uncertainty of predicting a forecasted Y from a forecasted X, predicting a forecasted X from a forecasted Y, predicting a forecasted Y from X, and predicting a forecasted X from Y.

In one or more embodiments, what-if analytic 138 may modify the uncertainty interval when adjusting the forecasted values. For example, an original forecast may have an interval that is computed based on the forecast model. During the forecast scenario simulation, the resource prediction model may introduce additional uncertainty. The uncertainty interval may be shifted around the changed forecast values and/or expanded to reflect the uncertainty of predicting a change in the forecasted performance metric based on a change to the historical and/or forecasted demand metrics.

Figure 10A:
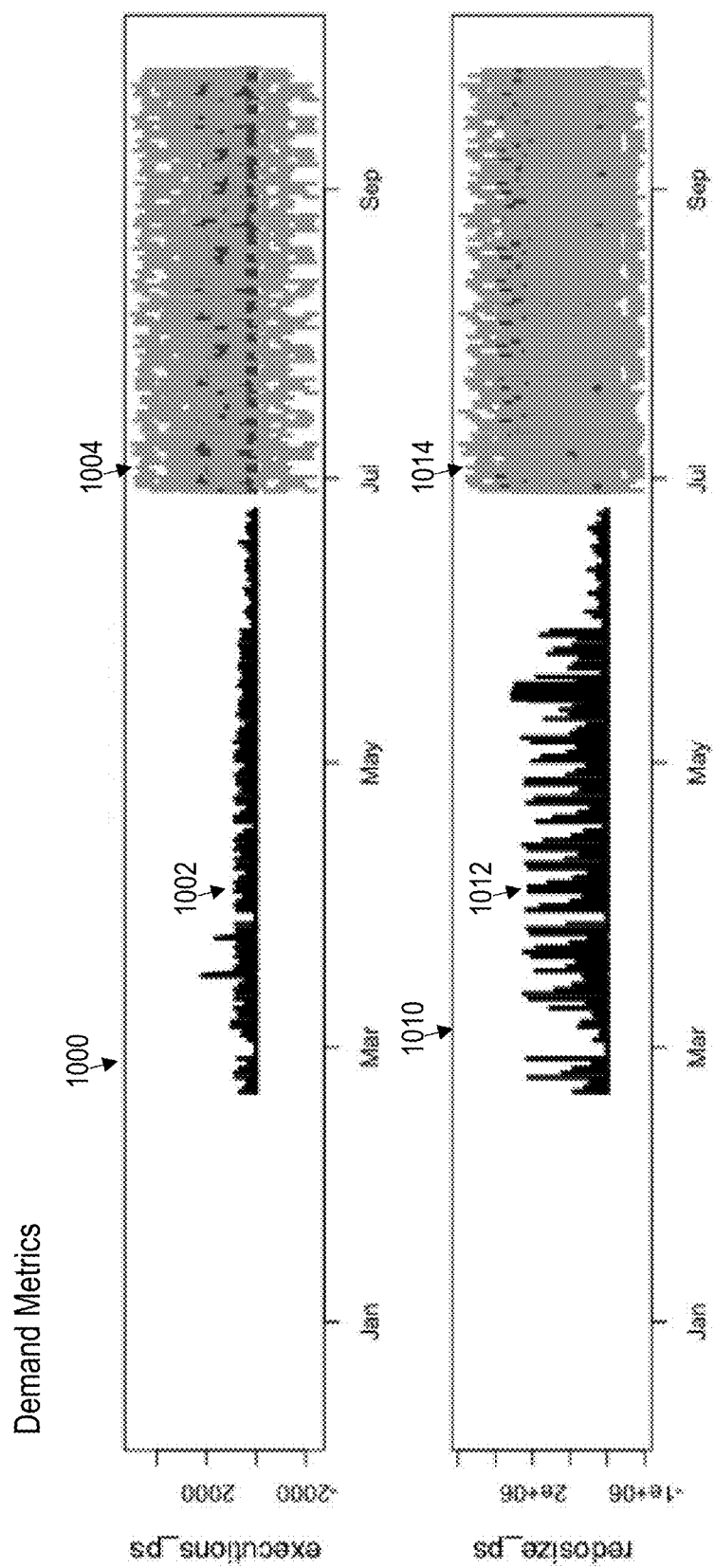
FIG. 10A illustrates an example set of demand time-series that were adjusted during a forecast scenario simulation, in accordance with one or more embodiments.

FIG. 10A illustrates an example set of demand time-series that were adjusted during a forecast scenario simulation, in accordance with one or more embodiments. The scenario parameters for this simulation may be defined as follows: "What if may system saw five times times more executions per seconds in the next two months?" Based on the simulation, what-if analytic 138 may present chart 1000, which illustrates an adjusted forecast (time-series plot 1004) for executions per second. Time-series plot 1002 depicts historical executions per second leading up to the forecast.

What-if analytic 138 may further present chart 1010 as part of the forecast scenario simulation. Time-series plot 1012 depicts historical size of redo data generated per second between March and July leading up to the forecast. Using a demand propagation model, the forecasted redo generated per second is adjusted, as depicted in time-series plot 1014, based on the five times increase in forecasted executions per second.

Figure 10B:
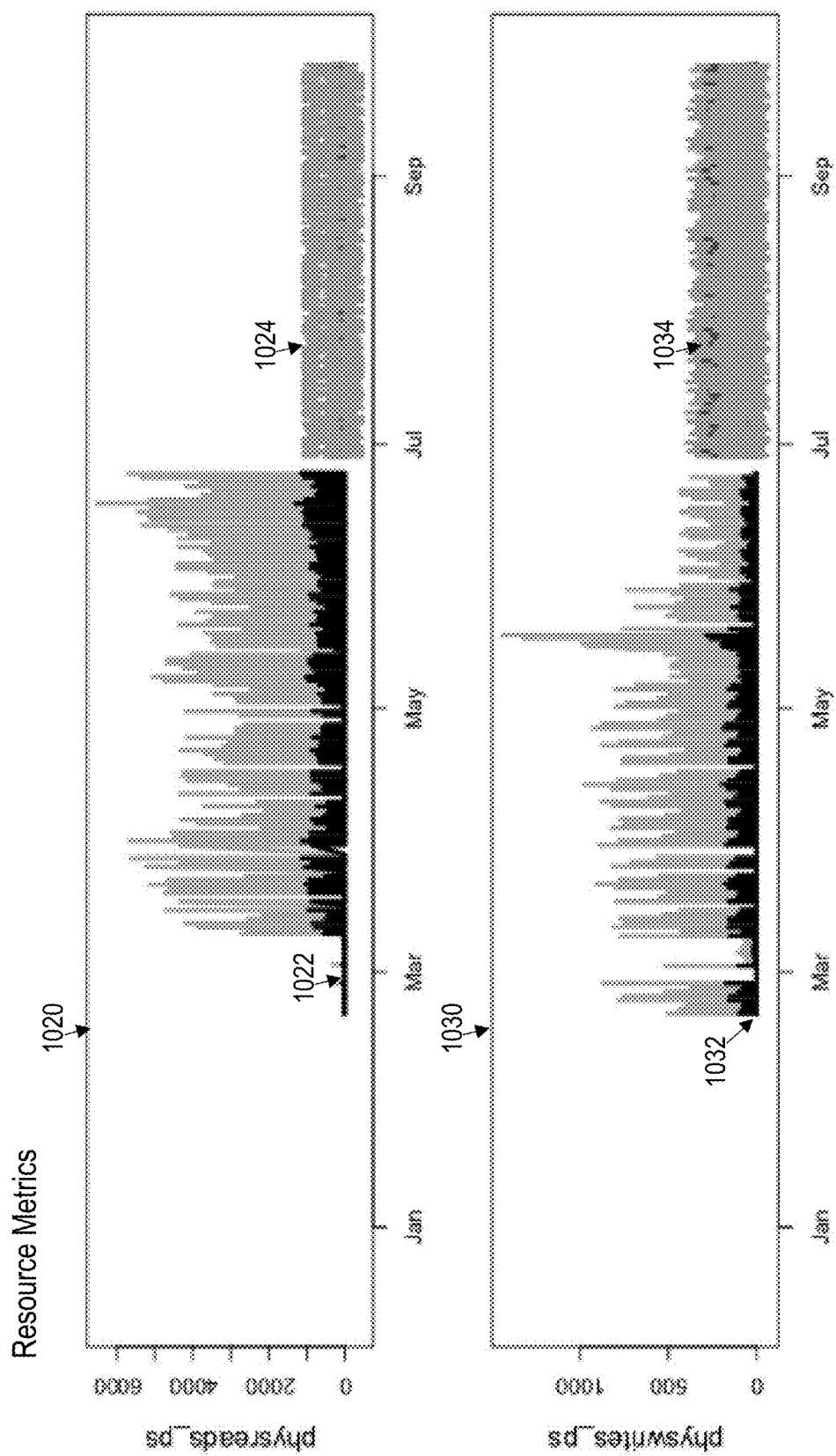
FIG. 10B illustrates an example set of resource time-series that were adjusted during a forecast scenario simulation, in accordance with one or more embodiments.

FIG. 10B illustrates an example set of resource time-series that were adjusted during a forecast scenario simulation, in accordance with one or more embodiments. Chart 820 depicts the historical number of physical reads per second (time-series plot 1022) and an adjusted forecast (time-series plot 1024). Chart 1030 depicts the historical physical writes per second (time-series plot 1032) and an adjusted forecast (time-series plot 1034).

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

9. Hardware Overview

According to one or more embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
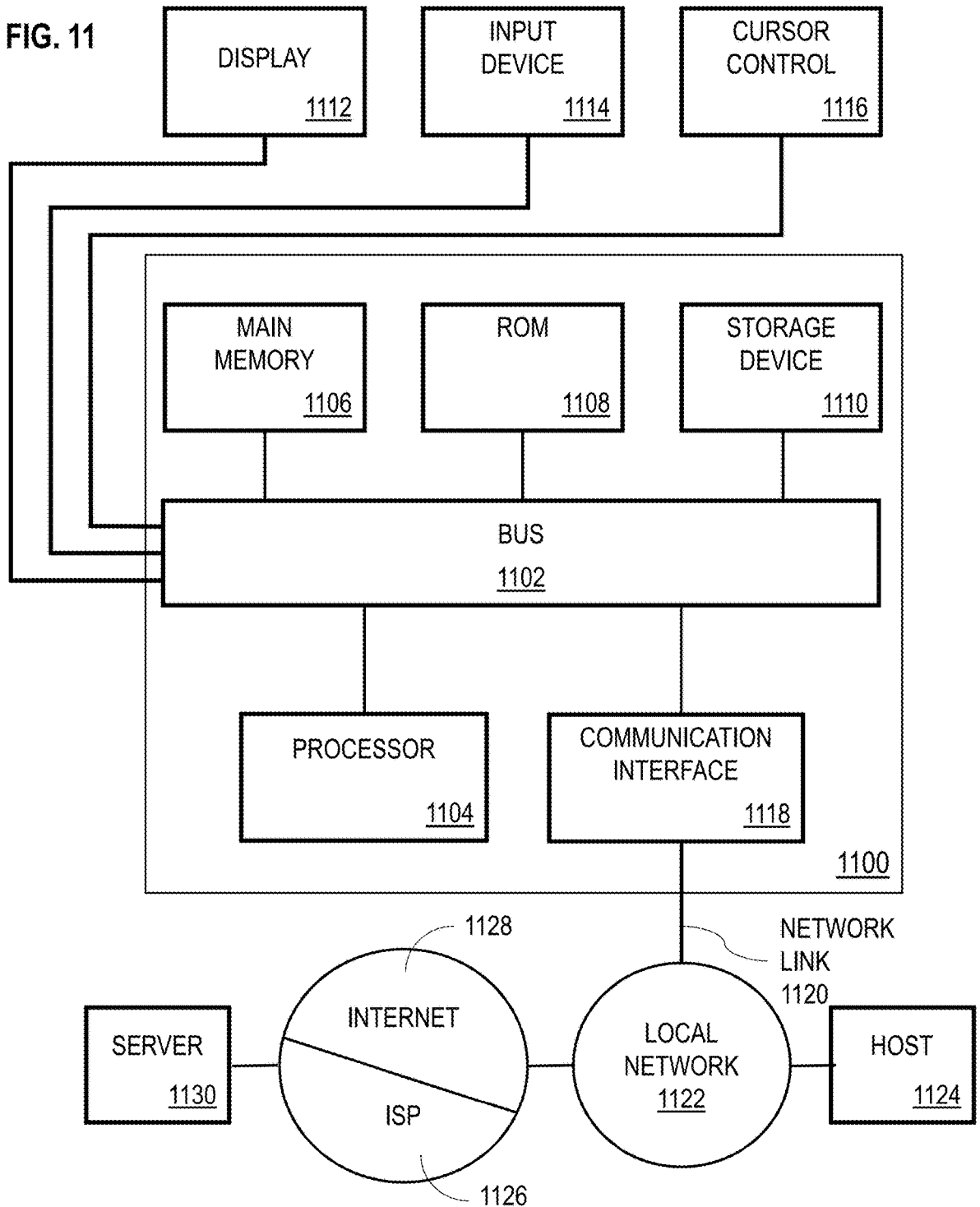
FIG. 11 illustrates an example computing system upon which one or more embodiments may be implemented.

For example, FIG. 11 is a block diagram that illustrates computer system 1100 upon which one or more embodiments may be implemented. Computer system 1100 includes bus 1102 or other communication mechanism for communicating information, and hardware processor 1104 coupled with bus 1102 for processing information. Hardware processor 1104 may be, for example, a general purpose microprocessor.

Computer system 1100 also includes main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes read only memory (ROM) 1108 or other static storage device coupled to bus 1102 for storing static information and instructions for processor 1104. Storage device 1110, such as a magnetic disk or optical disk, is provided and coupled to bus 1102 for storing information and instructions.

Computer system 1100 may be coupled via bus 1102 to display 1112, such as a cathode ray tube (CRT), liquid crystal display (LCD), or light-emitting diode (LED), for displaying information to a computer user. Input device 1114, which may include physical and/or touchscreen based alphanumeric keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to host computer 1124 or to data equipment operated by Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

10. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a plurality of time-series datasets including a first time-series dataset that represents a first demand of a plurality of demands on a resource, a second time-series dataset that represents a second demand of the plurality of demands on the resource and a third time-series dataset that represents a performance metric for the resource;
   determining a set of seasonal patterns including a first seasonal patterns and a second seasonal pattern within at least one of the first time-series dataset, the second time-series dataset, or the third time-series dataset;
   training at least one demand propagation model to propagate adjustments to the first demand of the plurality of demands on the resource to at least the second demand of the plurality of demands on the resource;
   training at least a first resource prediction model using a first set of data points associated with the first seasonal pattern and a second resource prediction model using a second set of data points associated with the second seasonal pattern, to generate adjustments to the performance metric for the resource as a function of adjustments to at least the first demand and the second demand of the plurality of demands on the resource;
   receiving a first adjustment to a first set of one or more values associated with the first time-series dataset that represents the first demand on the resource; and
   responsive to receiving the first adjustment to the first set of one or more values:
   (a) generating, based on the first adjustment using the at least one demand propagation model, a second adjustment to a second set of one or more values associated with the second time-series dataset; and
   (b) generating based on the first adjustment and the second adjustment using at least one of the first resource prediction model or the second resource prediction model, a third adjustment to a third set of one or more values associated with the third time-series dataset.

2. The method of claim 1, wherein the first adjustment to a first set of one or more values includes a change to at least one historic value that corresponds to a measurement of the first demand on the resource.

3. The method of claim 1, the method further comprising: generating a set of forecasted values for the first time-series dataset; wherein the first adjustment includes a change to at least one forecasted value in the set of forecasted values.

4. The method of claim 1, wherein the third adjustment to the third set of one or more values includes a change to at least one historic value that corresponds to a measurement of the performance metric or a forecasted value for the performance metric.

5. The method of claim 1, wherein the third adjustment to the third set of one or more values includes a change to an uncertainty interval in a forecast.

6. The method of claim 1, wherein the first seasonal pattern corresponds to a seasonal highs; wherein the first resource prediction model is trained based on a correlation of seasonal high values in the third time-series dataset with corresponding values in the first time-series dataset; wherein the second seasonal pattern corresponds to seasonal lows; and wherein the second resource prediction model is trained based on a correlation of seasonal low values in the third time-series dataset with corresponding values in the first time-series dataset.

7. The method of claim 1, wherein the third adjustment comprising changing at least one value in a seasonal forecast to predict performance of the performance metric for a given scenario.

8. The method of claim 1, further comprising receiving a set of scenario parameters, the set of scenario parameters defining the first adjustment without defining the second adjustment or the third adjustment.

9. The method of claim 1, wherein the plurality of time-series datasets includes a set of time-series datasets representing different demands on the resource; the method further comprising for each respective time-series dataset in the set of time-series datasets: determining a respective correlation between the first time-series dataset and the respective time-series dataset; filtering the respective time-series dataset if the correlation is greater than a threshold; and generating a resource prediction model for each time-series datasets in the set of time-series dataset that have not been filtered.

10. One or more non-transitory computer-readable media storing instructions that, when executed by one or more hardware processors, cause performance of operations comprising:
receiving a plurality of time-series datasets including a first time-series dataset that represents a first demand of a plurality of demands on a resource, a second time-series dataset that represents a second demand of the plurality of demands on the resource and a third time-series dataset that represents a performance metric for the resource;
determining a set of seasonal patterns including a first seasonal patterns and a second seasonal pattern within at least one of the first time-series dataset, the second time-series dataset, or the third time-series dataset;
training at least one demand propagation model to propagate adjustments to the first demand of the plurality of demands on the resource to at least the second demand of the plurality of demands on the resource;
training at least a first resource prediction model using a first set of data points associated with the first seasonal pattern and a second resource prediction model using a second set of data points associated with the second seasonal pattern, to generate adjustments to the performance metric for the resource as a function of adjustments to at least the first demand and the second demand of the plurality of demands on the resource;
receiving a first adjustment to a first set of one or more values associated with the first time-series dataset that represents the first demand on the resource; and
responsive to receiving the first adjustment to the first set of one or more values:
(a) generating, based on the first adjustment using the at least one demand propagation model, a second adjustment to a second set of one or more values associated with the second time-series dataset; and
(b) generating based on the first adjustment and the second adjustment using at least one of the first resource prediction model or the second resource prediction model, a third adjustment to a third set of one or more values associated with the third time-series dataset.

11. The one or more non-transitory computer-readable media of claim 10, wherein the first adjustment to a first set of one or more values includes a change to at least one historic value that corresponds to a measurement of the first demand on the resource.

12. The one or more non-transitory computer-readable media of claim 10, the operations further comprising: generating a set of forecasted values for the first time-series dataset; wherein the first adjustment includes a change to at least one forecasted value in the set of forecasted values.

13. The one or more non-transitory computer-readable media of claim 10, wherein the third adjustment to the third set of one or more values includes a change to at least one historic value that corresponds to a measurement of the performance metric or a forecasted value for the performance metric.

14. The one or more non-transitory computer-readable media of claim 10, wherein the third adjustment to the third set of one or more values includes a change to an uncertainty interval in a forecast.

15. The one or more non-transitory computer-readable media of claim 10, wherein the first seasonal pattern corresponds to a seasonal highs; wherein the first resource prediction model is trained based on a correlation of seasonal high values in the third time-series dataset with corresponding values in the first time-series dataset; wherein the second seasonal pattern corresponds to seasonal lows; and wherein the second resource prediction model is trained based on a correlation of seasonal low values in the third time-series dataset with corresponding values in the first time-series dataset.

16. The one or more non-transitory computer-readable media of claim 10, wherein the third adjustment comprising changing at least one value in a seasonal forecast to predict performance of the performance metric for a given scenario.

17. The one or more non-transitory computer-readable media of claim 10, the operations comprising receiving a set of scenario parameters, the set of scenario parameters defining the first adjustment without defining the second adjustment or the third adjustment.

18. The one or more non-transitory computer-readable media of claim 10, wherein the plurality of time-series datasets includes a set of time-series datasets representing different demands on the resource; the operations further comprising for each respective time-series dataset in the set of time-series datasets: determining a respective correlation between the first time-series dataset and the respective time-series dataset; filtering the respective time-series dataset if the correlation is greater than a threshold; and generating a resource prediction model for each time-series datasets in the set of time-series dataset that have not been filtered.

19. A system comprising:
one or more hardware processors;
one or more non-transitory computer-readable media storing instructions that, when executed by the one or more hardware processors, cause:
receiving a plurality of time-series datasets including a first time-series dataset that represents a first demand of a plurality of demands on a resource, a second time-series dataset that represents a second demand of the plurality of demands on the resource and a third time-series dataset that represents a performance metric for the resource;

determining a set of seasonal patterns including a first seasonal patterns and a second seasonal pattern within at least one of the first time-series dataset, the second time-series dataset, or the third time-series dataset;

training at least one demand propagation model to propagate adjustments to the first demand of the plurality of demands on the resource to at least the second demand of the plurality of demands on the resource;

training at least a first resource prediction model using a first set of data points associated with the first seasonal pattern and a second resource prediction model using a second set of data points associated with the second seasonal pattern, to generate adjustments to the performance metric for the resource as a function of adjustments to at least the first demand and the second demand of the plurality of demands on the resource;

receiving a first adjustment to a first set of one or more values associated with the first time-series dataset that represents the first demand on the resource; and responsive to receiving the first adjustment to first set of one or more values:

(a) generating, based on the first adjustment using the at least one demand propagation model, a second adjustment to a second set of one or more values associated with the second time-series dataset; and (b) generating based on the first adjustment and the second adjustment using the at least one of the first resource prediction model or the second resource prediction model, a third adjustment to a third set of one or more values associated with the third time-series dataset.

20. The system of claim 19, wherein the first adjustment to a first set of one or more values includes a change to at least one historic value that corresponds to a measurement of the first demand on the resource.

\* \* \* \* \*

UNITED STATES PATENT AND TRADEMARK OFFICE
CERTIFICATE OF CORRECTION

PATENT NO. : 10,817,803 B2
APPLICATION NO. : 15/612999
DATED : October 27, 2020
INVENTOR(S) : Garvey et al.

It is certified that error appears in the above-identified patent and that said Letters Patent is hereby corrected as shown below:

On the Title Page

On page 3, Column 1, item (56) under Other Publications, Line 37, delete "Maste s" and insert -- Master's --, therefor.

On page 3, Column 2, item (56) under Other Publications, Line 62, delete "pattem-" and insert -- pattern- --, therefor.

In the Specification

In Column 10, Line 4, delete "n" and insert -- in --, therefor.

In Column 10, Line 40, delete "cases." and insert -- cases --, therefor.

In Column 20, Line 57, delete "times times" and insert -- times --, therefor.

In the Claims

In Column 32, Line 5, in Claim 19, before "first" insert -- the --.

In Column 32, Line 8, in Claim 19, before "at" delete "the".

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*